US008759453B2

(12) United States Patent
Clark et al.

(10) Patent No.: US 8,759,453 B2
(45) Date of Patent: Jun. 24, 2014

(54) MULTIFUNCTIONAL CHAIN SHUTTLING AGENTS

(71) Applicant: Dow Global Technologies LLC, Midland, MI (US)

(72) Inventors: Thomas P. Clark, Midland, MI (US); Nahrain E. Kambler, Midland, MI (US); Sara B. Klamo, Houston, TX (US); Phillip D. Hustad, Manvel, TX (US); David R. Wilson, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/667,149

(22) Filed: Nov. 2, 2012

(65) Prior Publication Data

US 2013/0072639 A1    Mar. 21, 2013

Related U.S. Application Data

(62) Division of application No. 12/845,023, filed on Jul. 28, 2010, now Pat. No. 8,324,416.
(60) Provisional application No. 61/229,425, filed on Jul. 29, 2009.

(51) Int. Cl.
*C08F 8/00* (2006.01)
*C08F 8/06* (2006.01)
*C08F 8/30* (2006.01)
*C08F 8/34* (2006.01)
*C08F 8/40* (2006.01)

(52) U.S. Cl.
USPC ............... 525/326.1; 525/333.7; 525/338; 525/374; 525/383

(58) Field of Classification Search
USPC ............... 525/333.7, 338, 326.1, 374, 383
See application file for complete search history.

(56) References Cited

U.S. PATENT DOCUMENTS

| | | | |
|---|---|---|---|
| 5,247,023 A | 9/1993 | Chung et al. | |
| 5,939,495 A | 8/1999 | Kioka et al. | |
| 6,372,379 B1 | 4/2002 | Samii et al. | |
| 6,524,742 B1 | 2/2003 | Emanuel et al. | |
| 6,586,138 B2 | 7/2003 | Pekala et al. | |
| 6,749,961 B1 | 6/2004 | Nguyen et al. | |
| 7,517,466 B2 | 4/2009 | Asakawa et al. | |
| 2006/0177643 A1 | 8/2006 | Kondo et al. | |
| 2006/0188786 A1 | 8/2006 | Lee et al. | |
| 2007/0167315 A1 | 7/2007 | Arriola et al. | |
| 2007/0167578 A1 | 7/2007 | Arriola et al. | |
| 2008/0311812 A1 | 12/2008 | Arriola et al. | |

FOREIGN PATENT DOCUMENTS

| | | |
|---|---|---|
| EP | 0295026 A2 | 12/1988 |
| EP | 0350059 A2 | 1/1990 |
| EP | 1264847 A1 | 12/2002 |
| JP | 2005/105147 A | 4/2005 |
| JP | 2005/307113 A | 11/2005 |
| WO | 2000/034384 A1 | 6/2000 |
| WO | 2003/100954 A2 | 12/2003 |
| WO | 2005/001956 A2 | 1/2005 |
| WO | 2005073283 A1 | 8/2005 |
| WO | 2005/090425 A1 | 9/2005 |
| WO | 2005/090426 A1 | 9/2005 |
| WO | 2005/090427 A1 | 9/2005 |
| WO | 2006/101595 A1 | 9/2006 |
| WO | 2007/035485 A1 | 3/2007 |
| WO | 2007/035492 A1 | 3/2007 |
| WO | 2007/035493 A2 | 3/2007 |

OTHER PUBLICATIONS

Agouri et al., "New Route for the preparation of block and graft polymers of olefins and vinyl monomers with high efficiency", Die. Makromolekulare Chemie, 1970, pp. 229-243, vol. 137.
Arriola et al., "Catalytic Production of Olefin Block Copolymers via Chain Shuttling Polymerization," Science, 2006, pp. 714-719, vol. 312, www.sciencemag.org.
Barakat et al., "Macromolecular Engineering of Polylactones and Polylactides. X. Selective End-functionalization of Poly(D,L)-Lactide," Journal of Polymer Science: Part A: Polymer Chemistry, 1003, pp. 505-514, vol. 31, John Wiley & Sons, Inc.
Burfield, "The synthesis of low molecular weight hydroxyl-tipped polyethylene and polypropylene by the intermediacy of Ziegler-Natta catalysts", Polymer, 1984, vol. 25, pp. 1817-1822, Butterworth & Co. (Publishers) Ltd.
Chung et al., "Synthesis of functional polyolefin copolymers with graft and block structures", Progress in Polymer Science, 2002, pp. 39-85, vol. 27, Elsevier Science Ltd.—disclosure.
Darling et al., "Living Polymerization: Rationale for Uniform Terminology", Journal of Polymer Science: Part A: Polymer Chemistry, 2000, pp. 1706-1708, bol. 38, John Wiley & Sons, Inc.
Domski et al., "Living Alkene Polymerization: New Methods for the Precision Synthesis of Polyolefins", Progress in Polymer Science, 2007, vol. 32, pp. 30-92, Elsevier Ltd.
Hagihara et al., "Copolymerization of ethylene or propylene with ?-Olefins containing hydroxyl groups with zirconocent/methylaluminoxane catalyst", Journal of Polymer Science: Part A: Polymer Chemistry, 2004, pp. 52-58, vol. 42, Wiley Periodicals, Inc.
Healy et al., "Sterically crowded aryloxide compounds of aluminum," Coordination Chemistry Reviews, 1994, vol. 130 Nos. 1-2, pp. 63-135, Elsevier Sequoia.
Lin et al., "Synthesis of chain end functional isotactic polypropylene by the combination of metallocene/MAO Catalyst and Organoborane Chain Transfer Agent," Macromolecules, 2008, pp. 8452-8457, vol. 41, No. 22, ACS Publications.
Lu et al., "Synthesis of diblock copolymers polyolefin-b-poly(?-caprolactone) and their applications as the polymeric compatilizer," Polymer, 2005, pp. 10585-10591, vol. 46, Elsevier Ltd.
Stapleton et al., "Sterically Hindered Aluminum Alkyls: Weakly Interacting Scavenging Agents of Use in Olefin Polymerization," Organometallics, 2006, vol. 25 No. 21, pp. 5083-5092, American Chemical Society.
Wang et al., "Polyethylene-Poly(L-lactide) Diblock copolymers: Synthesis and Compatibilization of Poly(L-lactide)/Polyethylene Blends," Journal of Polymer Science: Part A: Polymer Chemistry, 2001, pp. 2755-2766, vol. 39, John.Wiley & Sons, Inc.
Xu et al., "Synthesis of Syndiotactic Polystyrene (s-PS) containing a terminal polar group and diblock copolymers containing s-ps. And polar polymers," Macromolecules, 1999, pp. 8689-8692, vol. 32 No. 25, ACS Publications.
PCT/US2010/043483, International Search Report.
PCT/US2010/043483, International Preliminary Report on Patentability.
PCT/US2010/043483, Written Opinion of the International Searching Authority.

*Primary Examiner* — Caixia Lu

(57) ABSTRACT

The invention generally relates to chain shuttling agents (CSAs), a process of preparing the CSAs, a composition comprising a CSA and a catalyst, a process of preparing the composition, a processes of preparing polyolefins, end functional polyolefins, and telechelic polyolefins with the composition, and the polyolefins, end functional polyolefins, and telechelic polyolefins prepared by the processes.

3 Claims, No Drawings

MULTIFUNCTIONAL CHAIN SHUTTLING AGENTS

CROSS-REFERENCE TO RELATED APPLICATIONS

This application is a divisional application of U.S. application Ser. No. 12/845,023 filed on Jul. 28, 2010 and claims benefit from U.S. Provisional Patent Application No. 61/229,425, filed Jul. 29, 2009, the entire contents of which are hereby incorporated herein by reference.

BACKGROUND OF THE INVENTION

1. Field of the Invention

The invention generally relates to chain shuttling agents (CSAs), a process of preparing the CSAs, a composition comprising a CSA and a catalyst, a process of preparing the composition, processes of preparing polyolefins, end functional polyolefins, and telechelic polyolefins with the composition, and the polyolefins, end functional polyolefins, and telechelic polyolefins prepared by the processes.

2. Description of Related Art

Exchange or redistribution reactions of metal-ligand (e.g., alkylaluminums, aryloxyaluminums, alkylzincs, alkoxyzincs, and the like) complexes containing or derived polymerization catalysts are known. For example, see Healy M. D. et al., *Sterically crowded aryloxide compounds of aluminum*, Coordination Chemistry Reviews, 1994; 130(1-2):63-135; and Stapleton R. A., et al., *Olefin Polymerization*, Organometallics, 2006; 25(21):5083-5092.

Examples of telechelic polymers include polymeric chains containing a hydroxyl group at each chain end. Telechelic polymers can be used, for example, as rocket fuel binders and as ingredients in coatings, sealants, and adhesives.

Telechelic polymers have been prepared by a number of methods. U.S. Pat. No. 5,247,023 mentions telechelic polymers prepared from hydrocarbon polymers containing borane groups at chain ends or in polymer backbones thereof. Such telechelic polymers have a statistical (i.e., essentially random) distribution of terminal functional groups.

Examples of polyolefin polymers include polyolefin homopolymers and polyolefin block copolymers. Polyethylene (also known as polyethene or poly(methylene)), polypropylene, and poly(ethylene alpha-olefin) copolymers are examples of polyolefins (also known as polyalkenes) widely used in industry. They are desirable for making, for example, containers, tubing, films and sheets for packaging, and synthetic lubricants.

Block copolymers often have superior properties to properties of random copolymers and polymer blends. Properties, characteristics and, hence, applications of block copolymers are influenced by, among other things, how the block copolymers are made and structure and characteristics of catalysts used to prepare them.

One method of preparing block copolymers is living polymerization. Domski et al. review block copolymers prepared from olefin monomers using living polymerization catalysts (Domski, G. J.; Rose, J. M.; Coates, G. W.; Bolig, A. D.; Brookhart, M., in *Prog. Polym. Sci.*, 2007; 32:30-92). Living polymerization processes employ catalysts having a single type of active site. Those living polymerization processes that produce high yields of block copolymers essentially involve only initiation and propagation steps and essentially lack chain terminating side reactions. The living polymerization processes are characterized by an initiation rate which is on the order of or exceeds the propagation rate, and essentially the absence of termination or transfer reactions. A block copolymer prepared by living polymerization can have a narrow or extremely narrow distribution of molecular weight and can be essentially monodisperse (i.e., the molecular weight distribution is essentially one).

Examples of block copolymers that can be made by living polymerization are olefin block copolymers (e.g., poly(ethylene alpha-olefin) block copolymers) and, especially, amphiphilic diblock copolymers. Amphiphilic diblock copolymers comprise hydrophilic and hydrophobic polymer chains. Amphiphilic diblock copolymers are useful for, among other things, surfactants, dispersants, emulsifiers, stabilizers, and antifoaming agents for aqueous mixtures; surface modifiers for plastics; and compatibilizers in polymer blends and composites (Lu Y. et al., *Syntheses of diblock copolymers polyolefin-b-poly(ε-caprolactone) and their applications as the polymeric compatilizer*, Polymer, 2005; 46:10585-10591). Lu Y. et al. report a discontinuous polymerization process for making polyolefin-b-poly(ε-caprolactone) diblock copolymers. The discontinuous polymerization process polymerizes a select olefin with a metallocene catalyst system and a chain transfer agent, and isolates a resulting intermediate polyolefin having a terminal hydroxyl. Then in a different reactor, the discontinuous polymerization process converts the terminal hydroxyl of the intermediate polyolefin to an aluminum alkoxide derivative with diethylaluminum chloride, and subsequently uses the aluminum alkoxide derivative as an initiator for anionic ring opening polymerization of ε-caprolactone to give the polyolefin-b-poly(ε-caprolactone) diblock copolymer.

Reporting a significant advancement in preparation of olefin block copolymers (OBCs), Arriola D J, et al. mention a catalytic system that produces olefin block copolymers with alternating semicrystalline and amorphous segments and a number of desirable material properties (Arriola D J, et al., *Catalytic Production of Olefin Block Copolymers via Chain Shuttling Polymerization*, Science, 2006; 312: 714-719). The catalyst system can use a chain shuttling agent to transfer polymer chains between two distinct catalysts with different monomer selectivities in a single polymerization reactor. The catalyst system produces the OBCs under an economically favorable, continuous polymerization process.

As a result, chain shuttling agents and olefin block copolymers have recently been an important area of research. PCT International Patent Application Publication Numbers WO 2005/073283 A1; WO 2005/090425 A1; WO 2005/090426 A1; WO 2005/090427 A2; WO 2006/101595 A1; WO 2007/035485 A1; WO 2007/035492 A1; and WO 2007/035493 A2 mention certain CSAs, catalyst systems, and olefin polymer compositions prepared therewith. For example, the WO 2007/035493 A2 mentions multicentered CSAs and a process that uses the multicentered CSAs to prepare olefin polymer compositions uniquely characterized by a broad, especially a multimodal molecular weight distribution. The multicentered CSAs of WO 2007/035493 A2 are compounds or molecules containing more than one chain shuttling moieties joined by a polyvalent linking group.

There is a need in the art for new chain shuttling agents, polymerization processes of using same to prepare polyolefins, end functional polyolefins, and telechelic polyolefins, and the polyolefins, end functional polyolefins, and telechelic polyolefins prepared thereby, process of making amphiphilic diblock and multiblock copolymers, the amphiphilic diblock and multiblock copolymers prepared thereby, and articles comprising the polyolefins, end functional polyolefins, telechelic polyolefins, and amphiphilic diblock and multiblock copolymers.

BRIEF SUMMARY OF THE INVENTION

The present specification presents a new invention concept of a multifunctional chain shuttling agent. The invention multifunctional chain shuttling agent comprises a single compound or molecule that is characterizable as being capable of functioning in such a way that at least one olefin-containing polymeryl chain can be shuttled between two or more catalytic sites of an olefin polymerization catalyst having two or more catalytic sites or between two or more olefin polymerization catalysts and independently either: (a) a non-olefin polymerization reaction can be initiated by the multifunctional chain shuttling agent; (b) a functional group of the multifunctional chain shuttling agent can be characterized as being protected with a protecting group during the chain shuttling, and then incorporated into the olefin-containing polymeryl chain; or (c) a non-olefin polymerization reaction can be initiated by the functional group after it has been incorporated into the olefin-containing polymeryl chain.

In a preferred first embodiment, the multifunctional chain shuttling agent comprises a compound having one or more moieties capable of chain shuttling, one or more moieties capable of protecting or polymerization initiating, and at least one polyvalent linking group. The chain shuttling moieties are different than the protecting/polymerization initiating moieties. Each chain shuttling moiety and polymerization initiating moiety independently comprises a metal cation, each metal of the metal cations independently being tin or a metal of any one of Groups 2, 12, and 13 of the Periodic Table of the Elements. Each polyvalent linking group independently comprises from 2 to 20 carbon atoms; 0, 1, or 2 carbon-carbon double bonds; and from 1 to 4 heteroatoms, each heteroatom independently being either an oxygen atom, sulfur atom, hydrogen-substituted nitrogen atom (i.e., N(H)), hydrocarbyl-substituted nitrogen atom, hydrogen-substituted phosphorous atom (i.e., P(H)), or hydrocarbyl-substituted phosphorous atom. Each metal cation of a chain shuttling moiety independently is bonded to a different carbon atom of a same polyvalent linking group or to a carbon atom of a different polyvalent linking group and each metal cation of a polymerization initiating moiety independently is bonded to a different heteroatom of a same polyvalent linking group or to a heteroatom of a different polyvalent linking group, the metal cations thereby being spaced apart from each other by the at least one polyvalent linking group.

In a second embodiment, the present invention provides a process for preparing the invention multifunctional chain shuttling agent, the process comprising steps of: contacting a (hydroxy-, thiol- (i.e., —SH), hydrocarbylamino-, amino- (i.e., —NH$_2$), hydrocarbylphosphino-, or phosphino- (i.e., —PH$_2$) and vinyl-containing polyvalent group to an alkylperhydrocarbylmetal to respectively prepare an organometallic intermediate that is a hydrocarbylmetal vinyl-alkoxide, hydrocarbylmetal vinyl-sulfide, hydrocarbylmetal vinyl-(hydrocarbyl)amine, hydrocarbylmetal vinyl-amine, hydrocarbylmetal vinyl-(hydrocarbyl)phosphine, or hydrocarbylmetal vinyl-phosphine; and contacting the organometallic intermediate to a hydrcoarbylmetal monohydride, thereby preparing the multifunctional chain shuttling agent, each metal independently being a cation of tin or a metal of any one of Groups 2, 12, and 13 of the Periodic Table of the Elements.

In a third embodiment, the present invention provides a process for preparing a multifunctional composition, the process comprising a step of: contacting together ingredients comprising the invention multifunctional chain shuttling agent, an original olefin polymerization catalyst, and an original cocatalyst, the contacting being performed under catalyst preparing conditions (described later), thereby preparing the multifunctional composition, the multifunctional composition being capable of functioning as a multifunctional chain shuttling agent and an olefin polymerization catalyst.

In a fourth embodiment, the present invention provides the multifunctional composition prepared by the process of the third embodiment.

In a fifth embodiment, the present invention provides a process for preparing a (polyolefin-polyradical)-containing multifunctional chain shuttling agent, the process comprising a step of: contacting together reactants comprising one or more olefin polymerization catalysts and at least one olefin monomer, the one or more olefin polymerization catalysts comprising the multifunctional composition of the fourth embodiment and the contacting step being performed under olefin polymerizing conditions, thereby preparing a (polyolefin-polyradical)-containing multifunctional chain shuttling agent, the (polyolefin-polyradical)-containing multifunctional chain shuttling agent being a reaction product of the reactants.

In a sixth embodiment, the present invention provides the (polyolefin-polyradical)-containing multifunctional chain shuttling agent.

In a seventh embodiment, the present invention provides a process for preparing a telechelic (i.e., terminally-functionalized) polyolefin, the process comprising a step of: terminally functionalizing the polyolefin-polyradical of the (polyolefin-polyradical)-containing multifunctional chain shuttling agent, thereby preparing a telechelic polyolefin.

In an eighth embodiment, the present invention provides the telechelic polyolefin prepared by the process of the seventh embodiment, the telechelic polyolefin being characterizable as having spaced-apart first and second terminal functional groups, the process deriving the first terminal functional group from a chain shuttling moiety and the second terminal functional group from a polymerization initiating or protecting moiety, each such moiety being of the (polyolefin-polyradical)-containing multifunctional chain shuttling agent, the first and second terminal functional groups being structurally different from each other.

In a ninth embodiment, the present invention provides an article comprising the telechelic polyolefin of the eighth embodiment.

In a tenth embodiment, the present invention provides a process for preparing an end functional polyolefin, the process comprising a step of: terminating the polyolefin-polyradical of the (polyolefin-polyradical)-containing multifunctional chain shuttling agent, thereby preparing an end functional polyolefin of formula (III): H-polyolefin-CH$_2$—R$^L$—(X—H)$_w$ (III), wherein w is an integer of 1 or 2; each R$^L$ independently is (C$_1$-C$_{19}$)alkylene or (C$_2$-C$_{19}$)alkenylene; and each X independently is O, S, N((C$_1$-C$_{20}$)hydrocarbyl), or P((C$_1$-C$_{20}$)hydrocarbyl).

In an eleventh embodiment, the present invention provides the end functional polyolefin prepared by the process of the tenth embodiment.

In a twelfth embodiment, the present invention provides an article comprising the end functional polyolefin of the eleventh embodiment.

In a thirteenth embodiment, the present invention provides a process for preparing a polyolefin/polyester, polyolefin/polyether, polyolefin/polyamide, or polyolefin/polyisocyanate multiblock interpolymer, the process comprising a step of: contacting together ingredients comprising the (polyolefin-polyradical)-containing multifunctional chain shuttling agent and a polyester-, polyether-, polyamide-, or polyisocyanate-forming monomer; the contacting step being performed under polyester-, polyether-, polyamide-, or polyisocyanate-forming conditions, thereby preparing a polyolefin/polyester multiblock interpolymer, polyolefin/polyether multiblock interpolymer, polyolefin/polyamide multiblock interpolymer, or polyolefin/polyisocyanate multiblock interpolymer.

The multifunctional chain shuttling agents are characterizable as having at least two mutually compatible, yet different functional activities. One of the functional activities comprises a chain shuttling function. Another of the functional activities comprises a protecting/polymerization initiating function, which comprises a protecting group function or, in some embodiments, a polymerization initiating function, or in some embodiments both. Depending on circumstances of the use of the multifunctional chain shuttling agents, the chain shuttling function comprises safekeeping a polyolefin-polyradical chain and transferring it to one or more different olefin polymerization catalysts and ultimately back again for safekeeping. The polymerization initiating function essentially is for initiating polyester-, polyether-, polyamide-, or polyisocyanate-forming reactions, especially living polymerization reactions comprising ring-opening polyester-, polyether-, polyamide-, or polyisocyanate-forming reactions.

An advantage of the multifunctional chain shuttling agents is, for example, the invention's incorporation of two metal-containing, differently functional moieties into a single compound or molecule. Another advantage is that one of the metal-containing, differently functional moieties is capable of functioning as a chain shuttling group and another of the metal-containing, differently functional moieties is capable of functioning as a polymerization initiating group or protecting group in a continuous polymerization process.

Still another advantage of the multifunctional CSA is related to the design of the compound or molecule, which design separates the two different metal-containing, differently functional moieties by a mutually compatible linking group. The design provides a means for the metal-containing functional moiety employed for chain shuttling to successfully carry out chain shuttling functional activity in the presence of the metal-containing functional group employed for polymerization initiation or group protection. The design also provides a means for terminally functionalizing the polyolefin-polyradical of the (polyolefin-polyradical)-containing multifunctional chain shuttling agent or a means for initiating polymerization functional activity in the presence of the metal-containing functional group employed for chain shuttling. Such mutual compatibility between what until now could have been considered potentially conflicting functional moieties and activities is particularly valuable for making amphiphilic diblock and multiblock copolymers, especially in a continuous polymerization process.

Still an additional advantage is that the present invention provides new processes for preparing polyolefins, telechelic polyolefins, and amphiphilic diblock and amphiphilic multiblock copolymers.

Yet another advantage is that at least some of the polyolefin/polyester, polyolefin/polyether, polyolefin/polyamide, or polyolefin/polyisocyanate multiblock interpolymers are characterizable as having at least one unique characteristic such as, for example, polydispersity (as indicated by polydispersity index) and related unique applications (e.g., battery separators). Additional advantages of the present invention are possible as described later.

The polyolefin/polyester, polyolefin/polyether, polyolefin/polyamide, or polyolefin/polyisocyanate multiblock interpolymers prepared by a process of the present invention are useful for, among other things, surfactants, dispersants, emulsifiers, stabilizers, and antifoaming agents for aqueous mixtures; surface modifiers for plastics; and compatibilizers in polymer blends and composites. The polyolefin (which includes homopolymers and poly(olefin monomer-olefin comonomer) block copolymers as described later), telechelic polyolefin, and polyolefin/polyester, polyolefin/polyether, polyolefin/polyamide, or polyolefin/polyisocyanate multiblock interpolymers, are also useful in numerous articles and applications such as, for example, making battery separators, elastic films for hygiene applications (e.g., for diaper covers); flexible molded goods for appliances, tools, consumer goods (e.g., toothbrush handles), sporting goods, building and construction, automotive, and medical applications; flexible gaskets and profiles for appliance (e.g., refrigerator door gaskets and profiles), building and construction, and automotive applications; adhesives for packaging (e.g., for use in manufacturing corrugated cardboard boxes), hygiene applications, tapes, and labels; and foams for sporting goods (e.g., foam mats), packaging, consumer goods, and automotive applications.

Additional embodiments are described in the remainder of the specification, including the claims.

DETAILED DESCRIPTION OF THE INVENTION

In some embodiments, the polyvalent linking group independently comprises from 2 to 12, more preferably from 2 to 10, and still more preferably from 2 to 8 carbon atoms; and from 1 to 4 heteroatoms, each heteroatom independently being either an O, S, N(H), hydrocarbyl-substituted nitrogen atom, P(H), or hydrocarbyl-substituted phosphorous atom.

A preferred embodiment of the multifunctional chain shuttling agent is a compound of formula (I):

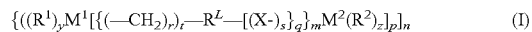

or an exchange product thereof,
wherein:
  m is an integer of 1, 2, 3, or 4; r is an integer of 1 or 2; t is an integer of 1 or 2; each of n, p, q, and s is an integer of 1; and when r is 1, then each $R^L$ independently is a $(C_1-C_{19})$alkylene or $(C_2-C_{19})$alkenylene; or when (a) r is 1 and t is 2, or (b) r is 2 and t is 1, or (c) each of m and s is 2 and r and t are each 1, then each $R^L$ independently is a trivalent radical of a $(C_3-C_{19})$alkane or $(C_3-C_{19})$alkene; or n is an integer of 1, 2, or 3; s is an integer of 1 or 2; p is an integer of 1 or 2; each of m, q, r, and t is an integer of 1; and when s and p are each 1, then each $R^L$ independently is a $(C_1-C_{19})$alkylene or $(C_2-C_{19})$alkenylene; or when (a) s is 1 and p is 2, or (b) s is 2 and p is 1, then each $R^L$ independently is a trivalent radical of a $(C_3-C_{19})$alkane or $(C_3-C_{19})$alkene; or q is an integer of 2 or 3; each of m, n, p, r, s, and t is an integer of 1; and each $R^L$ independently is a $(C_1-C_{19})$alkylene or $(C_2-C_{19})$alkenylene; or each of m, n, and q is an integer of 1; each of p, r, s, and t is an integer of 1 or 2; and $R^L$ is a tetravalent radical of a $(C_3-C_{19})$alkane or $(C_3-C_{19})$alkene, where one of r and t is 1 and the other of r and t is 2 and one of p and s is 1 and the other of p and s is 2;

y is an integer of 0, 1, or 2 and is chosen such that the sum of [y plus the multiplicative product of (n times q times r)] is equal to the formal oxidation state of $M^1$, i.e., (the formal oxidation state of $M^1$)=y+(n·q·r);

z is an integer of 0, 1, 2, or 3 and is chosen such that the sum of [z plus the multiplicative product of (m times q times s)] is equal to the formal oxidation state of $M^1$, i.e., (the formal oxidation state of $M^1$)=z+(m·q·s);

Each X independently is O, S, N(H), N(($C_1$-$C_{20}$)hydrocarbyl), P(H), P(($C_1$-$C_{20}$)hydrocarbyl);

Each $M^1$ is a metal of Group 2, 12, or 13 of the Periodic Table of the Elements, the Group 13 metal being in a formal oxidation state of +3 and the Group 2 or 12 metal being in a formal oxidation state of +2;

Each $M^2$ is tin or a metal of Group 12 or 13 of the Periodic Table of the Elements, the Group 12 metal being in a formal oxidation state of +2, the Group 13 metal being in a formal oxidation state of +3, and the tin being in a formal oxidation state of +2 or +4;

Each $R^1$ independently is a ($C_1$-$C_{20}$)hydrocarbyl; or, when y is 2, one $R^1$ is ($C_1$-$C_{20}$)hydrocarbyl and one $R^1$ is $R^3$N(H)—, $(R^3)_2$N—, $R^3$P(H)—, $(R^3)_2$P—, $R^3$S—, or $R^3$O—, or two $R^1$ are taken together to form a ($C_2$-$C_{20}$) hydrocarbylene; and Each $R^2$ independently is a hydrogen, ($C_1$-$C_{20}$)hydrocarbyl or -D-($C_1$-$C_{20}$)hydrocarbyl; or, when z is 2 or 3, two $R^2$ are taken together to form a ($C_2$-$C_{20}$)hydrocarbylene;

Each D, as shown in the -D-($C_1$-$C_{20}$)hydrocarbyl, independently is —C(=O)—, —C(=O)—O—, —O—C(=O)—, —C(=O)—N(($C_1$-$C_6$)hydrocarbyl)-, —N(($C_1$-$C_6$)hydrocarbyl)-C(=O)—, —S(=O)—, —S(=O)$_2$—, or —Si(($C_1$-$C_{20}$)hydrocarbyl)$_2$—;

Each $R^3$ independently is a ($C_1$-$C_{20}$)hydrocarbyl or (($C_1$-$C_{20}$)hydrocarbyl)$_3$Si—;

Each of the aforementioned ($C_1$-$C_{19}$)alkylene, ($C_2$-$C_{19}$)alkenylene, ($C_3$-$C_{19}$)alkane, ($C_3$-$C_{19}$)alkene, ($C_1$-$C_{20}$)hydrocarbyl, and ($C_2$-$C_{20}$)hydrocarbylene are the same or different and independently is unsubstituted or substituted with one or more substituents $R^S$; and Each $R^S$ independently is halo, polyfluoro, perfluoro, unsubstituted ($C_1$-$C_{18}$)alkyl, or unsubstituted ($C_1$-$C_9$)heteroaryl.

A more preferred embodiment of the multifunctional chain shuttling agent of formula (I) that is a compound of formula (IA):

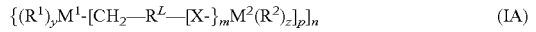
(IA)

or an exchange product thereof,
wherein:
m is an integer of 1, 2, 3, or 4, each of n and p is an integer of 1, and each $R^L$ independently is a ($C_1$-$C_{19}$)alkylene or ($C_2$-$C_{19}$)alkenylene; or n is an integer of 1, 2, or 3, each of m and p is an integer of 1, and each $R^L$ independently is a ($C_1$-$C_{19}$)alkylene or ($C_2$-$C_{19}$)alkenylene; or p is an integer of 2, each of m and n is an integer of 1, and $R^L$ is a trivalent radical of a ($C_3$-$C_{19}$)alkane or ($C_3$-$C_{19}$)alkene;

y is an integer of 0, 1, or 2 and is chosen such that a sum of y+n is equal to the formal oxidation state of $M^1$;

z is an integer of 0, 1, 2, or 3 and is chosen such that a sum of z+m is equal to the formal oxidation state of $M^2$; and X, $M^1$, $M^2$, $R^1$, and $R^2$ are as defined previously for formula (I);
or Each of m, n, and p is 1, $(R^1)_yM^1$ is absent and $M^2$, $R^2$, and z, are as defined previously for formula (I).

In the diradical group D, and the like, the —C(=O)— means carbonyl, —C(=O)—O— means a carboxyl diradical (C and O radicals, C radical being bonded to $M^2$), —O—C(=O)— means a carboxyl diradical (O and C radicals, O radical being bonded to $M^2$), —C(=O)—N(($C_1$-$C_6$)hydrocarbyl)- means an N—($C_1$-$C_6$)hydrocarbyl-substituted carboxamido diradical (C and N radicals, C radical being bonded to $M^2$), —N(($C_1$-$C_6$)hydrocarbyl)-C(=O)— means an N—($C_1$-$C_6$)hydrocarbyl)-substituted carboxamido diradical (N and C radicals, N radical being bonded to $M^2$), —S(=O)— means sulfinyl (also called thionyl), —S(=O)$_2$— means sulfonyl, and —Si(($C_1$-$C_{20}$)hydrocarbyl)$_2$- means a di(($C_1$-$C_6$)hydrocarbyl)-substituted silyl diradical.

In some embodiments where each of m, n, and p is 1, $(R^1)_yM^1$ is absent, $M^2$ is taken together with the $CH_2$ in formula (IA) to form a multifunctional chain shuttling agent of formula (II):

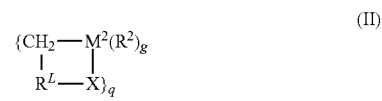
(II)

or an exchange product thereof, wherein g is an integer of 0, 1, or 2 and is chosen such that a sum of (g+2q) is equal to the formal oxidation state of $M^2$; q is defined as for the compound of formula (I), and $R^L$, X, $M^2$, and $R^2$ are as defined for the compound of formula (IA). In solution, the multifunctional chain shuttling agent of formula (II) may be characterizable as forming an acyclic oligomeric structure.

In the multifunctional chain shuttling agent of formula (I), each group $(R^1)_yM^1$-$CH_2$ comprises an example of the chain shuttling, metal cation-containing moiety, the $CH_2$ being derived from the polyvalent linking group $CH_2$—$R^L$. Each group X-$M^2(R_2)_z$ comprises an example of the protecting/polymerization initiating, metal cation-containing moiety. The protecting group moiety comprises a protecting group for —OH, —SH, —NH$_2$, —N(H)($C_1$-$C_{20}$)hydrocarbyl, —PH$_2$, or —P(H)($C_1$-$C_{20}$)hydrocarbyl. Preferably, the protecting group comprises the $M^2$ (e.g., $M^2(R^2)_z$ or an exchange product thereof). The $R^L$ portion of the polyvalent linking group, $CH_2$—$R^L$, compatibly links the one or more chain shuttling moieties to the one or more protecting/polymerization initiating moieties.

In another embodiment, the present invention provides a process for preparing the compound of formula (I):

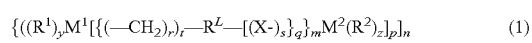
(1)

or an exchange product thereof, the process comprising steps of:

(a) contacting together an alkylperhydrocarbylmetal of formula (1):

(1), wherein $M^2$, $R^2$ and z are as defined previously in the first embodiment,
and a (hydroxy-, thiol-, amino-, hydrocarbylamino-, phosphino-, or hydrocarbylphosphino-) and vinyl-containing polyvalent group of formula (2):

(2), wherein $R^4$ is hydrogen or a ($C_1$-$C_5$)alkyl and $R^{L1}$ is absent or a polyvalent radical of a ($C_1$-$C_{18}$)hydrocarbon, the ($C_1$-$C_{18}$) hydrocarbon being saturated or mono- or di-unsaturated and $R^4$ and $R^{L1}$ being selected so that the number t $C(R^4)$ groups and $R^{L1}$ have a total number of carbon atoms of from 1 to 19 carbon atoms; and X, p and r are as defined previously in the first embodiment, to give a hydrocarbylmetal vinyl-alkoxide/sulfide/amide/phosphide of formula (3):

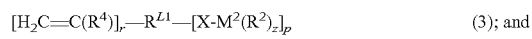
(3); and (b) contacting the hydrocarbylmetal vinyl-alkoxide/sulfide/amide/phosphide of formula (3) to n mole equivalents of a hydrocarbylmetal monohydride of formula (4):

$$HM^1(R^1)_y \quad (4)$$

wherein y, $M^1$, and $R^1$ are as defined previously in the first embodiment, to give the multifunctional chain shuttling agent of formula (I):

$$\{((R^1)_y M^1[\{(-CH_2)_r-R^L-[(X-)_s\}_q\}_m M^2(R^2)_z]_p]_n \quad (I),$$

or an exchange product thereof,
wherein $R^L$, X, $R^1$, $R^2$, $M^1$, $M^2$, m, n, p, q, r, s, t, y, and z are as defined previously.

In some embodiments, the (polyolefin-polyradical)-containing multifunctional chain shuttling agent is characterizable as being capable of functioning as a chain shuttling agent, a polymerization initiating agent, a protecting agent, or any combination thereof. In some embodiments, the (polyolefin-polyradical)-containing multifunctional chain shuttling agent is characterizable as being capable of functioning as an intermediate in a process for preparing the invention telechelic polyolefin, polyolefin, polyolefin/polyether, polyolefin/polyamide, or polyolefin/polyisocyanate multiblock interpolymer, or polyolefin/polyester multiblock interpolymer.

The term "polyolefin-polyradical" means a polymeric group comprising residuals of at least one olefin monomer and two or more radicals. The polyolefin-polyradical is formally obtained by removing a hydrogen atom from each of at least two carbon atoms. In some embodiments, the polyolefin-polyradical of the (polyolefin-polyradical)-containing multifunctional chain shuttling agent comprises from 2 to 5 radicals, more preferably 2 or 3 radicals, and still more preferably 2 radicals.

In some embodiments, the reactants in the process of the fifth embodiment further comprise an associate olefin polymerization catalyst and an olefin comonomer, the associate olefin polymerization catalyst being characterizable as being chemically different from, and having different selectivities for the olefin monomer than, the original olefin polymerization catalyst; the prepared (polyolefin-polyradical)-containing multifunctional chain shuttling agent being a poly(olefin monomer-olefin comonomer)-polyradical-containing multifunctional chain shuttling agent. In some embodiments, the associate olefin polymerization catalyst is activated with the original cocatalyst. In some embodiments, the reactants further comprise an associate cocatalyst, the associate cocatalyst being for activating the associate olefin polymerization catalyst. The terms "original olefin polymerization catalyst" and "associate olefin polymerization catalyst" are used for convenience to distinguish between two (or more) different catalysts when describing certain embodiments of the invention process. Likewise, the terms "original cocatalyst" and "associate cocatalyst" are used for convenience to distinguish between two (or more) different cocatalysts when describing certain embodiments of the invention process.

Where the reactants in the process of the fifth embodiment further comprise the associate olefin polymerization catalyst and the olefin comonomer as described previously, the (polyolefin-polyradical)-containing multifunctional chain shuttling agent produced thereby and of the sixth embodiment is a poly(olefin monomer-olefin comonomer)-containing multifunctional chain shuttling agent.

In some embodiments, preferably the (polyolefin-polyradical)-containing multifunctional chain shuttling agent is the poly(olefin monomer-olefin comonomer)-polyradical-containing multifunctional chain shuttling agent and the polyolefin is the poly(olefin monomer-olefin comonomer). Thus are provided preferred aspects of the seventh through thirteenth embodiments that respectively are: ($7^{th}$): a process for preparing a telechelic poly(olefin monomer-olefin comonomer); ($8^{th}$): the telechelic poly(olefin monomer-olefin comonomer), the telechelic poly(olefin monomer-olefin comonomer) being characterizable as having a non-statistical distribution of terminal functional groups; ($9^{th}$): an article comprising the telechelic poly(olefin monomer-olefin comonomer); ($10^{th}$): a process for preparing an end functional poly(olefin monomer-olefin comonomer); ($11^{th}$): the end functional poly(olefin monomer-olefin comonomer); ($12^{th}$): an article comprising the end functional poly(olefin monomer-olefin comonomer); and ($13^{th}$): a process for preparing a poly(olefin monomer-olefin comonomer)/polyester, poly(olefin monomer-olefin comonomer)/polyether, poly(olefin monomer-olefin comonomer)/polyamide, or poly(olefin monomer-olefin comonomer)/polyisocyanate multiblock interpolymer.

In any embodiment, preferably each polyolefin-polyradical being a poly(olefin monomer-olefin comonomer)-polyradical and each polyolefin being a poly(olefin monomer-olefin comonomer) multiblock copolymer.

Preferably, the (polyolefin-polyradical)-containing multifunctional chain shuttling agent comprises a composition of formula (IV):

$$\{(R^1)_y M^1-[(polyolefin\text{-}polyradical)\text{-}CH_2-R^L-[X\text{-}\}_m M^2(R^2)_z]_p]_n \quad (IV)$$

or an exchange product thereof, and the poly(olefin monomer-olefin polyradical)-containing multifunctional chain shuttling agent comprises a composition of formula (IVa):

$$\{(R^1)_y M^1-[(poly(olefin\ monomer\text{-}olefin\ polyradical))\text{-}CH_2-R^L-[X\text{-}\}_m M^2(R^2)_z]_p]_n \quad (IVa)$$

or an exchange product thereof, where in formulas (IV) and (IVa): $R^1$, $R^2$, y, $M^1$, $R^L$, X, m, $M^2$, z, p, and n are as defined in the first embodiment, or a reaction product of two or more of the reactants in the process of the fifth embodiment. An example of the reaction product is the composition of formula (IV) or (IVa) where $R^1$, $R^2$, or $R^1$ and $R^2$ independently are residuals of a reaction product of the olefin monomer. Another example is for the composition of formula (IVa), one or both of $R^1$ and $R^2$ independently are residuals of a reaction product of the olefin comonomer.

As mentioned previously for step (a) of the process of the fifth embodiment, the process further employs, and the multifunctional composition of the fourth embodiment further comprises, the associate olefin polymerization catalyst. In such embodiments, the original and associate olefin polymerization catalysts are independently employed in same or different catalytic amounts; the original and associate cocatalysts are independently employed in same or different cocatalytic amounts; and the invention multifunctional chain shuttling agent being characterizable, without limitation, as functioning in step (a) in such a way that polymer chains are transferred back-and-forth between the original and associate olefin polymerization catalysts.

The invention polymers are sometimes collectively referred to herein as the instant block interpolymers. The term "poly(ethylene alpha-olefin) block copolymer" is used interchangeably herein with the terms "olefin block copolymer," "OBC," "ethylene/α-olefin block interpolymer," and "ethylene/α-olefin block copolymer". The terms "alpha-olefin" and "α-olefin" are used interchangeably herein.

For purposes of United States patent practice and other patent practices allowing incorporation of subject matter by reference, the entire contents—unless otherwise indicated—of each U.S. patent, U.S. patent application, U.S. patent application publication, PCT international patent application and WO publication equivalent thereof, referenced in the instant Summary or Detailed Description of the Invention are hereby incorporated by reference. In an event where there is a conflict between what is written in the present specification and what is written in a patent, patent application, or patent application publication, or a portion thereof that is incorporated by reference, what is written in the present specification controls.

In the present application, any lower limit of a range of numbers, or any preferred lower limit of the range, may be combined with any upper limit of the range, or any preferred upper limit of the range, to define a preferred aspect or embodiment of the range. Each range of numbers includes all numbers, both rational and irrational numbers, subsumed within that range (e.g., the range from about 1 to about 5 includes, for example, 1, 1.5, 2, 2.75, 3, 3.80, 4, and 5).

In an event where there is a conflict between a compound name and its structure, the structure controls.

In an event where there is a conflict between a unit value that is recited without parentheses, e.g., 2 inches, and a corresponding unit value that is parenthetically recited, e.g., (5 centimeters), the unit value recited without parentheses controls.

As used herein, "a," "an," "the," "at least one," and "one or more" are used interchangeably. In any aspect or embodiment of the instant invention described herein, the term "about" in a phrase referring to a numerical value may be deleted from the phrase to give another aspect or embodiment of the instant invention. In the former aspects or embodiments employing the term "about," meaning of "about" can be construed from context of its use. Preferably "about" means from 90 percent to 100 percent of the numerical value, from 100 percent to 110 percent of the numerical value, or from 90 percent to 110 percent of the numerical value. In any aspect or embodiment of the instant invention described herein, the open-ended terms "comprising," "comprises," and the like (which are synonymous with "including," "having," and "characterized by") may be replaced by the respective partially closed phrases "consisting essentially of," "consists essentially of," and the like or the respective closed phrases "consisting of," "consists of," and the like to give another aspect or embodiment of the instant invention. In the present application, when referring to a preceding list of elements (e.g., ingredients), the phrases "mixture thereof," "combination thereof," and the like mean any two or more, including all, of the listed elements. The term "or" used in a listing of members, unless stated otherwise, refers to the listed members individually as well as in any combination, and supports additional embodiments reciting any one of the individual members (e.g., in an embodiment reciting the phrase "10 percent or more," the "or" supports another embodiment reciting "10 percent" and still another embodiment reciting "more than 10 percent."). The term "plurality" means two or more, wherein each plurality is independently selected unless indicated otherwise.

Unless otherwise noted, the phrase "Periodic Table of the Elements" refers to the official periodic table, version dated Jun. 22, 2007, published by the International Union of Pure and Applied Chemistry (IUPAC). Also any references to a Group or Groups shall be to the Group or Groups reflected in this Periodic Table of the Elements.

Unless otherwise noted, the general term "hydrocarbyl" preferably is a $(C_1-C_{20})$hydrocarbyl. As used herein, the term "$(C_1-C_{20})$hydrocarbyl" means a hydrocarbon radical of from 1 to 20 carbon atoms and the term "$(C_2-C_{20})$hydrocarbylene" means a hydrocarbon diradical of from 2 to 20 carbon atoms, wherein each hydrocarbon radical and diradical independently is aromatic or non-aromatic, saturated or unsaturated, straight chain or branched chain, cyclic (including mono- and poly-cyclic, fused and non-fused polycyclic) or acyclic, or a combination of two or more thereof; and each hydrocarbon radical and diradical is the same as or different from another hydrocarbon radical and diradical, respectively, and independently substituted by one or more $R^S$ or, preferably, unsubstituted.

Preferably, a $(C_1-C_{20})$hydrocarbyl independently is an unsubstituted or substituted $(C_1-C_{20})$alkyl, $(C_3-C_{20})$cycloalkyl, $(C_3-C_{10})$cycloalkyl-$(C_1-C_{10})$alkylene, $(C_6-C_{20})$aryl, or $(C_6-C_{10})$aryl-$(C_1-C_{10})$alkylene. More preferably, each of the aforementioned groups independently has a maximum of 18 carbon atoms (e.g., $(C_1-C_{18})$alkyl, $(C_3-C_{18})$cycloalkyl, $(C_3-C_9)$cycloalkyl-$(C_1-C_9)$alkylene, $(C_6-C_{18})$aryl, or $(C_6-C_{10})$aryl-$(C_1-C_8)$alkylene), still more preferably 12 carbon atoms (e.g., $(C_1-C_{12})$alkyl, $(C_3-C_{12})$cyclo alkyl, $(C_3-C_8)$cycloalkyl-$(C_1-C_4)$alkylene, $(C_6-C_{12})$aryl, or $(C_6)$aryl-$(C_1-C_6)$alkylene).

The term "$(C_1-C_{20})$alkyl" means a saturated straight or branched hydrocarbon radical of from 1 to 20 carbon atoms that is unsubstituted or substituted by one or more $R^S$. Preferably, $(C_1-C_{20})$alkyl has a maximum of 18 carbon atoms, more preferably 12 carbon atoms, still more preferably 8 carbon atoms. Examples of unsubstituted $(C_1-C_{20})$alkyl are unsubstituted $(C_1-C_{18})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{20})$alkyl are substituted $(C_1-C_{18})$alkyl, substituted $(C_1-C_{10})$alkyl, trifluoromethyl, and $(C_{25})$alkyl. Preferably, each $(C_1-C_5)$alkyl independently is methyl, ethyl, 1-propyl, or 2-methylethyl.

The term "$(C_6-C_{20})$aryl" means an unsubstituted or substituted (by one or more $R^S$) mono-, bi- or tricyclic aromatic hydrocarbon radical of from 6 to 20 total carbon atoms, of which at least from 6 to 14 are ring carbon atoms, and the mono-, bi- or tricyclic radical respectively comprises 1, 2 or 3 rings, wherein the 2 or 3 rings independently are fused or non-fused and the 1 ring is aromatic and at least one of the 2 or 3 rings is aromatic. Preferably, $(C_6-C_{20})$aryl has a maximum of 18 carbon atoms, more preferably 10 carbon atoms, still more preferably 6 carbon atoms. Examples of unsubstituted $(C_6-C_{20})$aryl are unsubstituted $(C_6-C_{18})$aryl; 2-$(C_1-C_5)$alkyl-phenyl; 2,4-bis$(C_1-C_5)$alkyl-phenyl; 2,4,6-tris$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; anthracenyl; and phenanthrenyl. Examples of substituted $(C_6-C_{20})$aryl are substituted $(C_6-C_{18})$aryl; 2,4-bis[$(C_6)$alkyl]-phenyl; polyfluorophenyl; pentafluorophenyl; and fluoren-9-one-1-yl.

The term "$(C_3-C_{20})$cycloalkyl" means a saturated cyclic hydrocarbon radical of from 3 to 20 carbon atoms that is unsubstituted or substituted by one or more $R^S$. Preferably, $(C_3-C_{20})$cycloalkyl has a maximum of 18 carbon atoms, more preferably 12 carbon atoms, still more preferably 6 carbon atoms. Examples of unsubstituted $(C_3-C_{20})$cycloalkyl are unsubstituted $(C_3-C_{12})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{20})$cycloalkyl are substituted $(C_3-C_{12})$cycloalkyl, substituted $(C_3-C_{10})$cycloalkyl, cyclopentanon-2-yl, and 1-fluorocyclohexyl.

Thus, $(C_2-C_{20})$hydrocarbylene means an unsubstituted or substituted diradical analog of $(C_6-C_{20})$aryl, $(C_3-C_{20})$cycloalkyl, or $(C_2-C_{20})$alkyl, i.e., $(C_6-C_{20})$arylene, $(C_3-C_{20})$cycloalkylene, and $(C_2-C_{20})$alkylene, respectively. More preferably, each of the aforementioned groups independently has a maximum of 20 carbon atoms (e.g., $(C_6-C_{18})$arylene, $(C_3-C_{20})$cycloalkylene, and $(C_2-C_{20})$alkylene), still more preferably 12 carbon atoms (e.g., ($C_6$-$C_{12}$)arylene, ($C_3$-$C_{12}$)cycloalkylene, and ($C_2$-$C_{12}$)alkylene). In some embodiments, the diradicals are on adjacent carbon atoms (i.e., 1,2-diradicals), or spaced apart by one, two, or more intervening carbon atoms (e.g., respective 1,3-diradicals, 1,4-diradicals, etc.). Preferred is a 1,2-, 1,3-, 1,4-, or alpha,omega-diradical, more preferably a 1,2-diradical.

The term "($C_1$-$C_{19}$)alkylene" means a saturated straight or branched chain diradical of from 1 to 19 carbon atoms that is unsubstituted or substituted by one or more $R^S$. Examples of unsubstituted ($C_1$-$C_{19}$)alkylene are unsubstituted ($C_1$-$C_{12}$)alkylene, including unsubstituted 1,2-($C_1$-$C_{12}$)alkylene and unsubstituted ($C_1$-$C_7$)alkylene. Examples of unsubstituted ($C_1$-$C_7$)alkylene are —$CH_2$—, —$CH_2CH_2$—, —$(CH_2)_3$—,

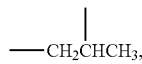

—$(CH_2)_4$—, —$(CH_2)_5$—, —$(CH_2)_6$—, and —$(CH_2)_5C(H)(CH_3)$—. Examples of substituted ($C_1$-$C_{19}$)alkylene are substituted ($C_1$-$C_{10}$)alkylene, substituted ($C_1$-$C_7$)alkylene, —$CF_2$—, and —$(CH_2)_{14}C(CH_3)_2(CH_2)_5$— (i.e., a 6,6-dimethyl substituted normal-1,20-eicosylene).

The term "($C_2$-$C_{19}$)alkenylene" means a mono- or di-unsaturated, saturated straight or branched chain diradical of from 2 to 19 carbon atoms that is unsubstituted or substituted by one or more $R^S$. Preferably, the ($C_2$-$C_{19}$)alkenylene is mono-unsaturated, that is, contains 1 carbon-carbon double bond.

The terms "($C_3$-$C_{19}$)alkane" and "($C_3$-$C_6$)alkane" means a hydrocarbon molecule comprising from 3 to 19 or from 3 to 6 carbon atoms, respectively, the molecule being unsubstituted or substituted, saturated, acyclic or cyclic, straight or branched.

The term "($C_3$-$C_{19}$)alkene" means a mono- or di-unsaturated hydrocarbon molecule comprising from 3 to 19 carbon atoms, the molecule being unsubstituted or substituted, acyclic or cyclic, straight or branched. Preferably, the ($C_3$-$C_{19}$)alkene is mono-unsaturated, that is, contains 1 carbon-carbon double bond.

The term "($C_1$-$C_9$)heteroaryl" means an unsubstituted or substituted (by one or more $R^S$) mono- or bicyclic heteroaromatic cyclic radical of from 1 to 9 ring carbon atoms and from 1 to 4 ring heteroatoms, the heteroatoms independently being oxygen, nitrogen, phosphorous, or sulfur. The monocyclic and bicyclic heteroaromatic radicals comprise 1 or 2 rings, respectively, wherein the 2 rings of the bicyclic heteroaromatic radical independently are fused or non-fused to each other and at least one of the 2 rings is aromatic. Preferably, the ($C_1$-$C_9$)heteroaryl is a 5- or 6-membered monocycle or a 9- or 10-membered bicycle. Examples of unsubstituted ($C_1$-$C_9$)heteroaryl are unsubstituted ($C_1$-$C_4$)heteroaryl, pyrrol-1-yl; furan-3-yl; thiophen-2-yl; pyrazol-1-yl; isoxazol-2-yl; isothiazol-5-yl; imidazol-1-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; pyridine-2-yl; pyrimidin-2-yl; pyrazin-2-yl; indol-1-yl; benzimidazole-1-yl; quinolin-2-yl; and isoquinolin-1-yl.

The term "halo" means fluoro (—F), chloro (—Cl), bromo (—Br), or iodo (—I) radical. Preferably, halo is fluoro or chloro, more preferably fluoro. The term "halide" means fluoride ($F^-$), chloride ($Cl^-$), bromide ($Br^-$), or iodide ($F^-$) anion.

Preferably, there are no O—O, S—S, or O—S bonds, other than O—S bonds in an S(O) or $S(O)_2$ diradical functional group, in the multifunctional CSA of formula (I).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds, not including any such double bonds that may be present in substituents $R^S$, if any, or in (hetero)aromatic rings, if any.

The term, "chain shuttling agent" refers to a compound such as the multifunctional CSA of formula (I) or mixture of such compounds that is capable of causing polymeryl (i.e., polymer chain) exchange between at least two active catalyst sites of the original and associate olefin polymerization catalysts under the olefin polymerization conditions. That is, transfer of a polymer fragment occurs both to and from one or more of active sites of the olefin polymerization catalysts.

In contrast to a chain shuttling agent, a "chain transfer agent" causes termination of polymer chain growth and amounts to a one-time transfer of polymer from a catalyst to the transfer agent. In some polymerization process embodiments such as those useful for preparing polyolefin homopolymers and random polyolefin copolymers, the multifunctional CSA is characterizable as functioning as a chain transfer agent. That is, the multifunctional CSA is characterizable as functioning in such a way that there is a one-time transfer of a polyolefin homopolymer or random polyolefin copolymer product formed in such polymerization process from the olefin polymerization catalyst to the multifunctional CSA. In such embodiments, it is not necessary for the multifunctional CSA to reversibly chain shuttle, as such embodiments typically employ only one olefin polymerization catalyst, which may have or use only one active catalyst site.

In some embodiments, the invention multifunctional chain shuttling agent is characterizable as having a chain shuttling activity ratio $R_{A-B}/R_{B-A}$. In general, for any two catalysts (A) and (B), the chain shuttling activity ratio $R_{A-B}/R_{B-A}$ is calculated by dividing a rate of chain transfer from an active site of a catalyst (A) to an active site of a catalyst (B) ($R_{A-B}$) by a rate of chain transfer from the active site of the catalyst (B) to the active site of the catalyst (A) ($R_{B-A}$). For the invention multifunctional chain shuttling agent, preferably the chain shuttling activity ratio $R_{A-B}/R_{B-A}$ is from 0.01 to 100, more preferably from 0.1 to 10, still more preferably from 0.5 to 2.0, and even more preferably from 0.8 to 1.2. Preferably, an intermediate formed between the invention multifunctional chain shuttling agent and the polymeryl chain is sufficiently stable that chain termination is relatively rare. The (polyolefin-polyradical)-containing multifunctional chain shuttling agent is an example of said intermediates.

By selecting different combinations of olefin polymerization catalysts having differing comonomer incorporation rates (as described herein) as well as differing reactivities, and by combining the invention multifunctional chain shuttling agent with one or more additional chain shuttling agents, the additional chain shuttling agents comprising one or more additional multifunctional chain shuttling agents of formula (I), or one or more non-invention chain shuttling agents, or a combination thereof, different poly(olefin monomer-olefin comonomer) multiblock copolymer products can be prepared. Such different products can have segments of different densities or comonomer concentrations, different block lengths, different numbers of such segments or blocks, or a combination thereof. For example, if the chain shuttling activity of the invention multifunctional chain shuttling agent is low relative to a polymer chain propagation rate of one or more of the catalysts, longer block length multiblock copolymers and polymer blends may be obtained as products. Contrariwise, if chain shuttling is very fast relative to polymer chain propagation, a copolymer product having a more random chain structure and shorter block lengths is obtained. In generally, an extremely fast chain shuttling agent may produce a multiblock copolymer having substantially random copolymer properties. By proper selection of both catalyst(s) and the invention multifunctional chain shuttling agent, relatively pure block copolymers, copolymers containing relatively large polymer segments or blocks, and/or blends of the foregoing with various ethylene homopolymers and/or copolymers can be obtained as products.

Where the invention comprises or employs at least one additional chain shuttling agent as described previously, preferably the invention comprises or employs a total of 3 or fewer, and more preferably a total of 2 chain shuttling agents, at least one of the total number of chain shuttling agents being the multifunctional chain shuttling agent of formula (I). Preferably the invention does not comprise or employ any non-invention chain shuttling agent. In some embodiments, however, it may be desirable to employ one or more non-invention chain shuttling agents. The non-invention chain shuttling agents that are suitable for combining with the invention multifunctional chain shuttling agent include Group 1, 2, 12 or 13 metal compounds or complexes containing at least one $(C_1-C_{20})$hydrocarbyl group, preferably $(C_1-C_{12})$hydrocarbyl substituted aluminum, gallium or zinc compounds, and reaction products thereof with a proton source. Preferred $(C_1-C_{20})$ hydrocarbyl groups are alkyl groups, preferably linear or branched, $(C_1-C_8)$alkyl groups. Most preferred shuttling agents for use in the present invention are trialkyl aluminum and dialkyl zinc compounds, especially triethylaluminum, tri(i-propyl)aluminum, tri(i-butyl)aluminum, tri(n-hexyl) aluminum, tri(n-octyl)aluminum, triethylgallium, or diethylzinc. Additional suitable shuttling agents include the reaction product or mixture formed by combining the foregoing organometal compound, preferably a tri$((C_1-C_8)$alkyl) aluminum or di$((C_1-C_8)$alkyl) zinc compound, especially triethylaluminum, tri(i-propyl) aluminum, tri(i-butyl)aluminum, tri(n-hexyl)aluminum, tri(n-octyl)aluminum, or diethylzinc, with less than a stoichiometric quantity (relative to the number of hydrocarbyl groups) of a primary or secondary amine, primary or secondary phosphine, thiol, or hydroxyl compound, especially bis(trimethylsilyl)amine, t-butyl(dimethyl)silanol, 2-hydroxymethylpyridine, di(n-pentyl)amine, 2,6-di(t-butyl)phenol, ethyl(1-naphthyfiamine, bis(2,3,6,7-dibenzo-1-azacycloheptaneamine), diphenylphosphine, 2,6-di(t-butyl)thiophenol, or 2,6-diphenylphenol. Desirably, sufficient amine, phosphine, thiol, or hydroxyl reagent is used such that at least one hydrocarbyl group remains per metal atom. The primary reaction products of the foregoing combinations most desired for use in the present invention as shuttling agents are n-octylaluminum di(bis(trimethylsilyl)amide), i-propylaluminum bis(dimethyl (t-butyl)siloxide), and n-octylaluminum di(pyridinyl-2-methoxide), i-butylaluminum bis(dimethyl(t-butyl)siloxane), i-butylaluminum di(bis(trimethylsilyl)amide), n-octylaluminum di(pyridine-2-methoxide), i-butylaluminum bis(di(n-pentyl)amide), n-octylaluminum bis(2,6-di-t-butylphenoxide), n-octylaluminum di(ethyl(1-naphthyfia-mide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide). Other suitable non-invention chain shuttling agents are described in WO 2005/073283 A1; WO 2005/090425 A1; WO 2005/090426 A1; WO 2005/090427 A2; WO 2006/101595 A1; WO 2007/035485 A1; WO 2007/035492 A1; and WO 2007/035493 A2.

The term "exchange product thereof" means a molecule or oligomeric substance derived by intramolecular redistribution of two or more ligands to $M^1$ or $M^2$, or by at least one ligand to $M^1$ and at least one ligand to $M^2$, or by intermolecular redistribution between at least one of said ligands of one molecule of formula (I) and at least one of said ligands of another molecule of formula (I); or a combination of the intramolecular and intermolecular redistributions. The ligands to $M^1$ refer to $R^1$ and the "$CH_2$" in formula (I). The ligands to $M^2$ refer to $R^2$ and the "X" in formula (I). The term "exchange product" may also be referred to herein as a "redistribution product." The invention contemplates exchange products of any invention multifunctional chain shuttling agent, including the multifunctional chain shuttling agent of any one of formulas (I) and (IV).

Examples of exchange products of the compound of formula (I) are compounds of formulas (IB) and (IC),

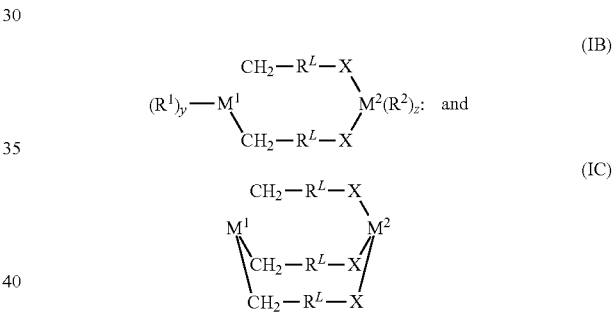

the compounds of formulas (IB) and (IC) having divalent $R^L$ groups; and compounds of formulas (ID) to (IK):

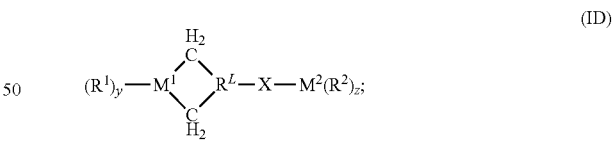

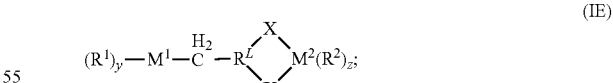

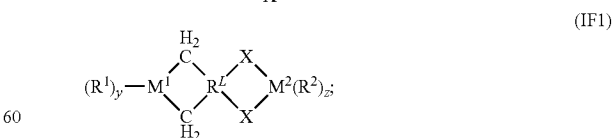

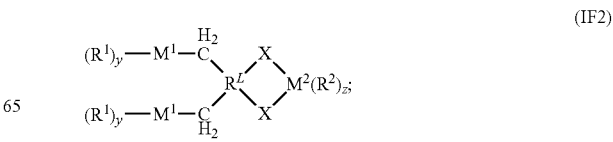

-continued

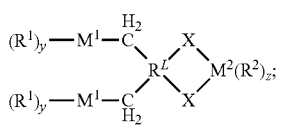
(IF3)

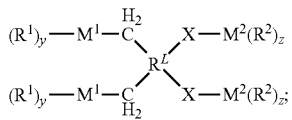
(IF4)

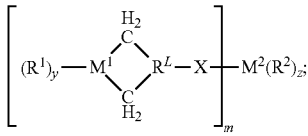
(IG)

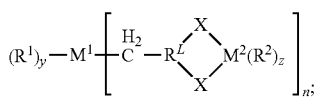
(IH)

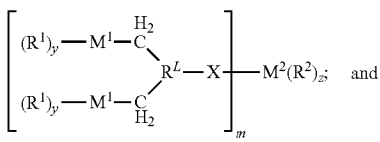
(IJ)

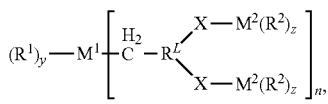
(IK)

wherein the compounds of formulas (ID), (IE), and (IG) to (IK) have trivalent $R^L$ groups and the compounds of formulas (IF1) to (IF4) have tetravalent $R^L$ groups. (Formula designation "(II)," i.e., pronounced "one i," has been purposely omitted from the immediately preceding structure designations in order to avoid confusion with the aforementioned formula (II), i.e., where the "(II)" is a Roman numeral two.)

In some embodiments of the multifunctional CSA of formula (I), m is an integer of 1, 2, 3, or 4; r is an integer of 1 or 2; t is an integer of 1 or 2; each of n, p, q, and s is an integer of 1, that is a multifunctional CSA of formula (Im):

$$\{((R^1)_yM^1(-CH_2)_r)_t-R^L-X-\}_mM^2(R^2)_z \quad (Im)$$

or an exchange product thereof, and when r is 1, then each $R^L$ independently is a $(C_1-C_{19})$alkylene or $(C_2-C_{19})$alkenylene; or when (a) r is 1 and t is 2, or (b) r is 2 and t is 1, or (c) each of m and s is 2 and r and t are each 1, then each $R^L$ independently is a trivalent radical of a $(C_3-C_{19})$alkane or $(C_3-C_{19})$alkene; and y, z, X, $M^1$, $M^2$, $R^1$, and $R^2$ are as defined previously for formula (I).

In some embodiments of the multifunctional CSA of formula (I), n is an integer of 1, 2, or 3; s is an integer of 1 or 2; p is an integer of 1 or 2; each of m, q, r, and t is an integer of 1, that is a multifunctional CSA of formula (In):

$$(R^1)_yM^1[-CH_2-R^L-[(X-)_sM^2(R^2)_z]_p]_n \quad (In)$$

or an exchange product thereof, and when s and p are each 1, then each $R^L$ independently is a $(C_1-C_{19})$alkylene or $(C_2-C_{19})$alkenylene; or when (a) s is 1 and p is 2, or (b) s is 2 and p is 1, then each $R^L$ independently is a trivalent radical of a $(C_3-C_{19})$alkane or $(C_3-C_{19})$alkene; and y, z, X, $M^1$, $M^2$, $R^1$, and $R^2$ are as defined previously for formula (I).

In some embodiments of the multifunctional CSA of formula (I), q is an integer of 2 or 3; each of m, n, p, r, s, and t is an integer of 1, that is a multifunctional CSA of formula (Iq):

$$((R^1)_yM^1\{-CH_2-R^L-X-\}_qM^2(R^2)_z \quad (Iq)$$

or an exchange product thereof, and each $R^L$ independently is a $(C_1-C_{19})$alkylene or $(C_2-C_{19})$alkenylene; and y, z, X, $M^1$, $M^2$, $R^1$, and $R^2$ are as defined previously for formula (I).

In some embodiments of the multifunctional CSA of formula (I), each of m, n, and q is an integer of 1; each of p, r, s, and t is an integer of 1 or 2, that is a multifunctional CSA of formula (Ip):

$$((R^1)_yM^1(-CH_2)_r)_t-R^L-[(X-)_sM^2(R^2)_z]_p \quad (Ip)$$

or an exchange product thereof, and $R^L$ is a tetravalent radical of a $(C_3-C_{19})$alkane or $(C_3-C_{19})$alkene, where one of r and t is 1 and the other of r and t is 2 and one of p and s is 1 and the other of p and s is 2; and y, z, X, $M^1$, $M^2$, $R^1$, and $R^2$ are as defined previously for formula (I).

In some embodiments of the multifunctional CSA of formula (I), $R^1$ and $R^2$ are aprotic, that is $R^1$ and $R^2$ do not contain an —OH, —NH, —PH, or —SH moiety.

In some embodiments of the multifunctional CSA of formula (IA), each of m, n and p is an integer of 1, and $R^L$ is a $(C_1-C_{19})$alkylene, such embodiments being a multifunctional CSA of formula (Ia):

$$(R^1)_yM^1\text{-}CH_2\text{-}(C_1\text{-}C_{19})\text{alkylene-}X\text{-}M^2(R^2)_z \quad (Ia)$$

or an exchange product thereof, wherein $R^1$, y, $M^1$, X, $M^2$, $R^2$, and z are as defined for the compound of formula (IA).

Preferred is the multifunctional CSA of formula (Ia) wherein y is 2, z is 2, X is O, and each of $M^1$ and $M^2$ is Al in a formal oxidation state of +3 as shown in formula (Ia-1):

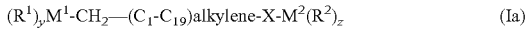
(Ia-1)

Preferred is the multifunctional CSA of formula (Ia) wherein y is 2, z is 2, X is $N((C_1-C_8)$alkyl), and each of $M^1$ and $M^2$ is Al in a formal oxidation state of +3 as shown in formula (Ia-2):

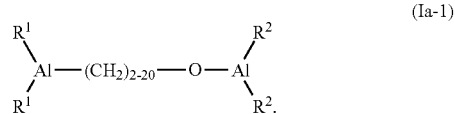
(Ia-2)

In some embodiments of the multifunctional CSA of formula (IA), n is an integer of 1, 2, or 3, each of m and p is an integer of 1, and $R^L$ is a $(C_1-C_{19})$alkylene, such embodiments being a multifunctional CSA of formula (Ib)

$$(R^1)_yM^1\text{-}[CH_2-(C_1\text{-}C_{19})\text{alkylene-}X\text{-}M^2(R^2)_z]_n \quad (Ib)$$

wherein $R^1$, y, $M^1$, X, $M^2$, $R^2$, and z are as defined for the compound of formula (IA).

Preferred is the multifunctional CSA of formula (Ib) wherein n is 3, y is 0 (thus $R^1$ is absent), z is 2, each X is O, each $R^L$ independently is a $(C_1-C_{19})$alkylene, and each of $M^1$ and $M^2$ is Al in a formal oxidation state of +3 as shown in formula (Ib-1):

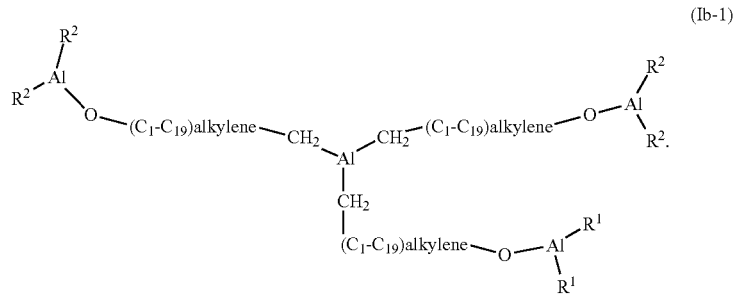
(Ib-1)

Preferred is the multifunctional CSA of formula (Ib) wherein n is 2, Y is O (thus $R^1$ is absent), z is 2, each X is O, each $R^L$ independently is a $(C_1-C_{19})$alkylene, $M^1$ is Zn in a formal oxidation state of +2, and $M^2$ is Al in a formal oxidation state of +3 as shown in formula (Ib-2):

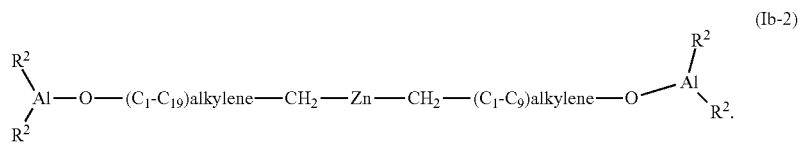
(Ib-2)

In some embodiments of the multifunctional CSA of formula (IA), p is 2, each of m and n is an integer of 1, and $R^L$ is a trivalent radical of a $(C_3-C_6)$alkane $$(R^1)_yM^1\text{-}CH_2\text{—}((C_3\text{-}C_{19})\text{alkan-triyl})\text{-}[X\text{-}M^2(R^2)_z]_2 \quad (Ic)$$

or an exchange product thereof, wherein $R^1$, y, $M^1$, X, $M^2$, $R^2$, and z are as defined for the compound of formula (IA).

Preferred is the multifunctional CSA of formula (Ic) wherein Y is 2, each z is 2, each X is O, $R^L$ is a trivalent radical of a $(C_3-C_{19})$alkane, and each of $M^1$ and $M^2$ is Al in a formal oxidation state of +3 as shown in formula (Ic-1):

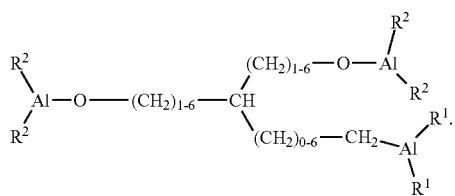
(Ic-1)

Preferred is the multifunctional CSA of formula (Ic-1) as shown in formula (Ic-1a):

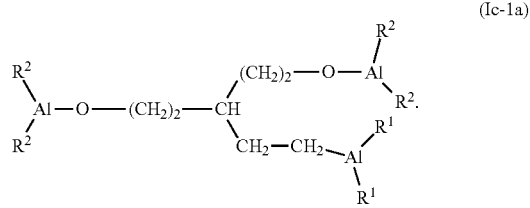
(Ic-1a)

In some embodiments of the multifunctional CSA of formula (IA), m is an integer of 1, 2, 3, or 4, each of n and p is an integer of 1, and $R^L$ is a $(C_1-C_{19})$alkylene, such embodiments being a multifunctional CSA of formula (Id):

$$\{(R^1)_yM^1\text{-}CH_2\text{—}(C_1\text{-}C_{19})\text{alkylene-X-}\}_mM^2(R^2)_z \quad (Id)$$

or an exchange product thereof, wherein $R^1$, y, $M^1$, X, $M^2$, $R^2$, and z are as defined for the compound of formula (IA).

Preferred is the multifunctional CSA of formula (Id) wherein m is 3, each y is 2, z is 0 (thus $R^2$ is absent), each X is O, each $R^L$ independently is $(C_1-C_{19})$alkylene, and each of $M^1$ and $M^2$ is Al in a formal oxidation state of +3 as shown in formula (Id-1):

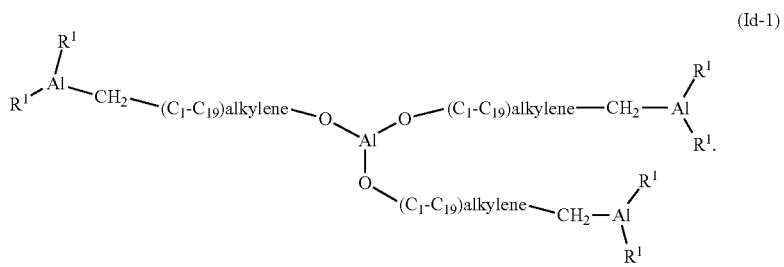
(Id-1)

In some embodiments of the multifunctional CSA of formula (IA), each of m, n and p is an integer of 1, and $R^L$ is a $(C_2-C_{19})$alkenylene, such embodiments being a multifunctional CSA of formula (Ie):

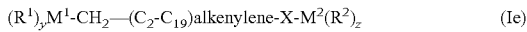

or an exchange product thereof, wherein $R^1$, y, $M^1$, X, $M^2$, $R^2$, and z are as defined for the compound of formula (IA).

Preferred is the multifunctional CSA of formula (Ie) wherein y is 2, z is 2, X is O, and each of $M^1$ and $M^2$ is Al in a formal oxidation state of +3 as shown in formula (Ie-1):

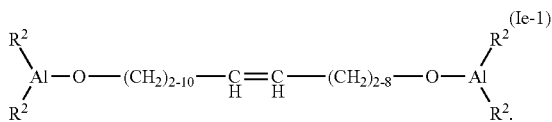

Preferred is the multifunctional CSA of formula (Ia) wherein y is 2, z is 2, X is N(($C_1-C_8$)alkyl), and each of $M^1$ and $M^2$ is Al in a formal oxidation state of +3 as shown in formula (Ie-2):

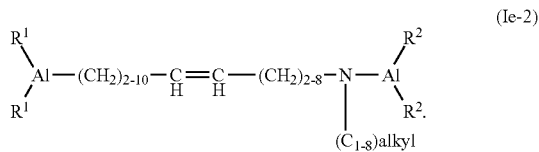

In some embodiments of the multifunctional CSA of formula (IA), each of m, n, and p is 1, $(R^1)_yM^1$ is absent, and $M^2$ is taken together with the $CH_2$ in formula (IA) to form the multifunctional chain shuttling agent of formula (II):

or an exchange product thereof, wherein g is an integer of 0, 1, or 2 and is chosen such that the sum of (g+2q) is equal to the formal oxidation state of $M^2$; and $R^L$, X, $M^2$, and $R^2$ are as defined for the compound of formula (IA).

Preferred is the multifunctional CSA of formula (II) wherein g is 1, q is 1, $R^L$ is $(CH_2)_{1-6}$, X is O, and $M^2$ is Al in a formal oxidation state of +3 as shown in formula (IIa):

Also preferred is the multifunctional CSA of any one of formulas (I), (IA), (Ia), (Ia-1), (Ib), (Ib-1), (Ib-2), (Ic), (Ic-1), (Id), (Id-1), (Ie), (Ie-1), (II), or (IIa), or an exchange product thereof, wherein instead of each X is O, at least one, and more preferably each X is N(($C_1-C_6$)alkyl) and any remaining X is as defined for formula (I). Also preferred is the multifunctional CSA of any one of formulas (I), (IA), (Ia), (Ia-1), (Ib), (Ib-1), (Ib-2), (Ic), (Ic-1), (Id), (Id-1), (Ie), (Ie-1), (II), or (IIa), or an exchange product thereof, wherein instead of each X is O, at least one, and more preferably each X is S, N(H), P(H), or P(($C_1-C_{20}$)hydrocarbyl), and any remaining X is as defined for formula (I).

In some embodiments of the multifunctional CSA of formula (I) (and thus any subgeneric formula such as, for example, (IA), (Ia), (Ia-1), (Ia-2), (Ib), (Ib-1), (Ib-2), (Ic), (Ic-1), (Id), (Id-1), (Ie), (Ie-1), (Ie-2), and (IIa)), certain $R^L$, X, $R^1$, $R^2$, $M^1$, $M^2$, m, n, p, q, r, s, t, y, and z are preferred.

Preferably $M^1$ and $M^2$ independently are a metal of Group 2 that is magnesium (Mg) or calcium (Ca), the Mg or Ca being in a formal oxidation state of +2; tin (Sn), the Sn being in a formal oxidation state of +2 or +4; a metal of Group 12 that is zinc (Zn), the Zn being in a formal oxidation state of +2; or a metal of Group 13 that is boron (B), aluminum (Al), or gallium (Ga), the B, Al, or Ga being in a formal oxidation state of +3.

More preferably, each $M^1$ independently is Al, B, or Ga, the Al, B, or Ga being in a formal oxidation state of +3; or Zn or Mg, the Zn or Mg being in a formal oxidation state of +2. In some embodiments, each $M^1$ independently is Al, B, or Ga, the Al, B, or Ga being in a formal oxidation state of +3. In some embodiments, each $M^1$ is Al in a formal oxidation state of +3. In some embodiments, each $M^1$ independently is Zn or Mg in a formal oxidation state of +2. In some embodiments, each $M^1$ is Zn in a formal oxidation state of +2.

Also more preferably, each $M^2$ is Al, the Al being in a formal oxidation state of +3; or Zn, the Zn being in a formal oxidation state of +2; or Sn, the Sn being in a formal oxidation state of +2 or +4. In some embodiments, each $M^2$ is Al in a formal oxidation state of +3. In some embodiments, each $M^2$ independently is Zn in a formal oxidation state of +2. In some embodiments, each $M^2$ independently is Sn in a formal oxidation state of +2 or +4.

In some embodiments, each $M^1$ and $M^2$ is Al in a formal oxidation state of +3. In some embodiments, each $M^1$ and $M^2$ is Zn in a formal oxidation state of +2.

In some embodiments, each $(CH_2)_{2-20}$, $(C_1-C_{19})$alkylene, $(C_2-C_{19})$alkenylene, trivalent radical of a $(C_3-C_{19})$alkane, or trivalent radical of a $(C_3-C_{19})$alkene for $R^L$ independently is a $(CH_2)_{2-12}$, $(C_1-C_{12})$alkylene, $(C_2-C_{12})$alkenylene, a trivalent radical of a $(C_3-C_{12})$alkane, or a trivalent radical of a $(C_2-C_{12})$alkene, respectively; more preferably, a $(CH_2)_{2-10}$, $(C_1-C_{10})$alkylene, $(C_2-C_{10})$alkenylene, a trivalent radical of a $(C_3-C_{10})$alkane, or a trivalent radical of a $(C_2-C_{10})$alkene, respectively; and still more preferably a $(CH_2)_{2-8}$, $(C_1-C_8)$alkylene, $(C_2-C_8)$alkenylene, a trivalent radical of a $(C_3-C_8)$alkane, or a trivalent radical of a $(C_2-C_8)$alkene, respectively.

In some embodiments, each $(C_1-C_8)$alkylene is an unbranched $(C_1-C_8)$alkylene. In some embodiments, each unbranched $(C_1-C_8)$alkylene independently is $CH_2$, $CH_2CH_2$, or $(CH_2)_3$. In some embodiments, the unbranched $(C_1-C_8)$alkylene independently is $(CH_2)_3$. In some embodiments, the unbranched $(C_1-C_8)$alkylene independently is $(CH_2)_4$, $(CH_2)_5$, or $(CH_2)_6$. In some embodiments, the unbranched $(C_1-C_8)$alkylene independently is $(CH_2)_8$. In some embodiments, each $(C_1-C_8)$alkylene is $(C_1$ or $C_2)$alkylene (i.e., $CH_2$ or $CH_2CH_2$).

In some embodiments, at least one $(C_1-C_8)$alkylene is a branched $(C_3-C_8)$alkylene.

In some embodiments, the trivalent radical of $(C_3-C_8)$alkane is a trivalent radical of a $(C_6)$alkane. In some embodiments, the trivalent radical of $(C_3-C_8)$alkane is a trivalent radical of a $(C_5)$alkane. In some embodiments, the trivalent radical of $(C_3-C_8)$alkane is a trivalent radical of a $(C_4)$alkane. In some embodiments, the trivalent radical of $(C_3-C_8)$alkane is a trivalent radical of a $(C_3)$alkane. The trivalent radical of the $(C_6)$alkane is more preferred.

In some embodiments, each $(C_2$-$C_8)$alkenylene is an unbranched $(C_2$-$C_8)$alkenylene. In some embodiments, each unbranched $(C_2$-$C_8)$alkenylene is —$(CH_2)_5$—$C(H)$=$C(H)$—$CH_2$—.

In some embodiments, each $R^2$ independently is a $(C_1$-$C_{40})$hydrocarbyl, and more preferably $(C_1$-$C_{20})$hydrocarbyl. In some embodiments, each $R^2$ independently is a —C(=O)—$(C_1$-$C_{20})$hydrocarbyl (e.g., acetyl, propionyl, or hexanoyl). In some embodiments, z is 2 or 3 and two $R^2$ are taken together to form a $(C_2$-$C_{20})$hydrocarbylene.

In some embodiments, at least one $(C_1$-$C_{40})$hydrocarbyl is $(C_1$-$C_{40})$alkyl. In some embodiments, $R^1$ is a $(C_1$-$C_{20})$alkyl. In some embodiments, $R^2$ is a $(C_1$-$C_{20})$alkyl. In some embodiments, each of $R^1$ and $R^2$ independently is a $(C_1$-$C_{20})$alkyl. In some embodiments, each $(C_1$-$C_{40})$hydrocarbyl is $(C_1$-$C_{20})$alkyl. In some embodiments, each $(C_1$-$C_{20})$alkyl independently is a $(C_1$-$C_{10})$alkyl, more preferably a $(C_2$-$C_8)$alkyl, and still more preferably a $(C_3$-$C_6)$alkyl. In some embodiments, y is 2, one $R^1$ is $(C_1$-$C_{20})$hydrocarbyl, and one $R^1$ is $(R^3)_2N$—, $(R^3)_2P$—, $R^3S$—, or $R^3O$—. In some embodiments, y is 2 and two $R^1$ are taken together to form a $(C_2$-$C_{20})$hydrocarbylene.

In some embodiments, $R^3$ is a $(C_1$-$C_{20})$hydrocarbyl. In some embodiments, $R^3$ is $((C_1$-$C_{20})$hydrocarbyl$)_3$Si—.

In some embodiments, each X is N(H). In some embodiments, each X is S. In some embodiments, each X is P(H). In some embodiments, each X is P$((C_1$-$C_{20})$hydrocarbyl). In some embodiments, and more preferably, each X is O. In some embodiments, and more preferably, each X is N$((C_1$-$C_{20})$hydrocarbyl). In some embodiments, each $(C_1$-$C_{20})$hydrocarbyl is $(C_1$-$C_{20})$alkyl. In some embodiments, $(C_1$-$C_{20})$alkyl is $(C_1$-$C_{12})$alkyl.

In some embodiments, each of the aforementioned $(C_1$-$C_{19})$alkylene, $(C_2$-$C_{19})$alkenylene, $(C_3$-$C_{19})$alkane, $(C_3$-$C_{19})$alkene, $(C_1$-$C_{20})$hydrocarbyl, and $(C_2$-$C_{20})$hydrocarbylene are unsubstituted (i.e., all groups in the multifunctional CSA of formula (I) are unsubstituted). In some embodiments, at least one of the aforementioned $(C_1$-$C_{19})$alkylene, $(C_2$-$C_{19})$alkenylene, $(C_3$-$C_{19})$alkane, $(C_3$-$C_{19})$alkene, $(C_1$-$C_{20})$hydrocarbyl, and $(C_2$-$C_{20})$hydrocarbylene is substituted with one or more substituents $R^S$, preferably 1 or 2 $R^S$. In some embodiments, each $R^S$ independently is fluoro, unsubstituted $(C_1$-$C_{18})$alkyl, or unsubstituted $(C_1$-$C_9)$heteroaryl, more preferably unsubstituted $(C_1$-$C_{10})$alkyl, or unsubstituted $(C_1$-$C_9)$heteroaryl. Preferably, the unsubstituted $(C_1$-$C_9)$heteroaryl is pyridinyl.

In some embodiments, polymerizable olefins (i.e., olefin monomers and olefin comonomers) useful in the invention processes are $(C_2$-$C_{40})$hydrocarbons consisting of carbon and hydrogen atoms and containing at least 1 and preferably no more than 3, and more preferably no more than 2 carbon-carbon double bonds, where the carbon-carbon double bonds do not include aromatic carbon-carbon bonds (e.g., as in phenyl). In some embodiments, from 1 to 4 hydrogen atoms of the $(C_2$-$C_{40})$hydrocarbons are replaced, each by a halogen atom, preferably fluoro or chloro to give halo-substituted $(C_2$-$C_{40})$hydrocarbons. The $(C_2$-$C_{40})$hydrocarbons (not halo-substituted) are preferred. Preferred polymerizable olefins (i.e., olefin monomers) useful for making the polyolefins are ethylene and polymerizable $(C_3$-$C_{40})$olefins. The $(C_3$-$C_{40})$ olefins include an alpha-olefin, a cyclic olefin, styrene, and a cyclic or acyclic diene. Preferably, the alpha-olefin comprises a $(C_3$-$C_{40})$alpha-olefin, more preferably a branched chain $(C_3$-$C_{40})$alpha-olefin, still more preferably a linear-chain $(C_3$-$C_{40})$alpha-olefin, even more preferably a linear chain $(C_3$-$C_{40})$alpha-olefin of formula (A): $CH_2$=$CH_2$—$(CH_2)_k$ $CH_3$ (A), wherein k is an integer of from 0 to 37, and yet even more preferably a linear-chain $(C_3$-$C_{40})$alpha-olefin that is 1-propene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, a $(C_8$-$C_{40})$alpha-olefin, or a linear chain $(C_{20}$-$C_{24})$alpha-olefin. Another preferred polyolefin is a $(C_8$-$C_{40})$olefin that is non-aromatic or aromatic, the aromatic $(C_8$-$C_{40})$olefin containing at least one derivative of benzene (e.g., styrene, alpha-methylstyrene or divinylbenzene) or naphthalene (e.g., vinyl-naphthalene). Similarly as mentioned above, the $(C_8$-$C_{40})$olefin can be optionally substituted to give a halo-substituted $(C_8$-$C_{40})$olefin (e.g., 4-fluorostyrene). Preferably the cyclic olefin is a $(C_3$-$C_{40})$cyclic olefin. Preferably, the cyclic or acyclic diene is a $(C_4$-$C_{40})$ diene, preferably an acyclic diene, more preferably an acyclic conjugated $(C_4$-$C_{40})$diene, more preferably an acyclic 1,3-conjugated $(C_4$-$C_{40})$diene, and still more preferably 1,3-butadiene.

Polyolefins (e.g., homopolymeric polyolefins, telechelic polyolefins, and end functional polyolefins) that can be made by the invention process include, for example, olefin homopolymers comprising residuals of one of the olefin monomers described in the immediately preceding paragraph. Examples of the polyolefin homopolymers are polyethylene, polypropylene, poly$(C_3$-$C_{40})$alpha-olefins, and polystyrene. Other polyolefins that can be made by the invention process include, for example, olefin interpolymers, including olefin copolymers, especially olefin block copolymers, and telechelic olefin interpolymers. In some embodiments are olefin interpolymers that comprise residuals of ethylene and one or more polymerizable $(C_3$-$C_{40})$olefins such as, for example, a poly(olefin monomer-olefin comonomer) block copolymer. Preferred polymerizable $(C_3$-$C_{40})$olefins are $(C_3$-$C_{40})$alpha-olefins. Preferred olefin interpolymers are those prepared by co-polymerizing a mixture of two or more polymerizable olefins such as, for example, ethylene/propylene, ethylene/1-butene, ethylene/1-pentene, ethylene/1-hexene, ethylene/4-methyl-1-pentene, ethylene/1-octene, ethylene/styrene, ethylene/propylene/butadiene, ethylene/propylene/hexadiene, ethylene/propylene/ethylidenenorbornene, and other EPDM terpolymers. Preferably, the polyolefin is an ethylene homopolymer (e.g., a high density polyethylene), an ethylene/alpha-olefin interpolymer (i.e., poly(ethylene alpha-olefin) copolymer such as, for example, a poly(ethylene 1-octene)), or an ethylene/alpha-olefin/diene interpolymer (i.e., a poly(ethylene alpha-olefin diene)terpolymer such as, for example, a poly(ethylene 1-octene 1,3-butadiene). The polyolefins include non-block poly(olefin monomer-olefin comonomer) copolymers.

In some embodiments, the invention polyolefin comprises a blend of at least two different polyolefins, at least one of which can be made by the invention process. Examples of such blends include a blend of polypropylene homopolymer and an invention poly(olefin monomer-olefin comonomer) block copolymer.

In some embodiments, the invention poly(olefin monomer-olefin comonomer) block copolymer can be represented by the following formula:

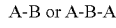

where "A" represents a hard block or segment and "B" represents a soft block or segment. Preferably, As and Bs are linked in a linear fashion, not in a branched or a star fashion.

Other embodiments of the invention can be represented by the following formula:

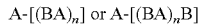

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a linear fashion, not in a branched or a star fashion.

Further embodiments of the invention can be represented by the following formula:

A-(AB)$_n$-A or A-(AB)$_n$-B or B-(AB)$_n$-B where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a linear fashion, not in a branched or a star fashion.

In other embodiments, the invention poly(olefin monomer-olefin comonomer) block copolymers usually do not have a third type of block. In still other embodiments, each of block A and block B has monomers or comonomers randomly distributed within the block. In other words, neither block A nor block B comprises two or more segments (or sub-blocks) of distinct composition, such as a tip segment, which has a different composition than the rest of the block.

In other embodiments, the invention poly(olefin monomer-olefin comonomer) block copolymers do have a third type of block or segment and can be represented by the following formula:

A-B-C where "A" represents a hard block or segment, "B" represents a soft block or segment, and "C" represents either a hard or soft block or segment. Preferably, As, Bs, and Cs are linked in a linear fashion, not in a branched or a star fashion.

Other embodiments of the invention can be represented by the following formula:

A-(BC)$_n$ or A-(BC)$_n$B or A-(CB)$_n$ or A-(CB)$_n$C where n is at least 1, preferably an integer greater than 1, such as 2, 3, 4, 5, 10, 15, 20, 30, 40, 50, 60, 70, 80, 90, 100, or higher, "A" represents a hard block or segment, "B" represents a soft block or segment, and "C" represents either a hard or soft block or segment. Preferably, As, Bs, and Cs are linked in a linear fashion, not in a branched or a star fashion.

Further embodiments of the invention can be represented by the following formula:

A-(BC)$_n$-A or A-(BC)$_n$-B or A-(BC)$_n$-C or B-(AC)$_n$-A or B-(AC)$_n$-B or B-(AC)$_n$-C or C-(AB)$_n$-A or C-(AB)$_n$-B or C-(AB)$_n$-C where n is at least 1, preferably an integer greater than 1, such as 2, 3, 4, 5, 10, 15, 20, 30, 40, 50, 60, 70, 80, 90, 100, or higher, "A" represents a hard block or segment, "B" represents a soft block or segment, and "C" represents either a hard or soft block or segment. Preferably, As and Bs are linked in a linear fashion, not in a branched or a star fashion.

"Hard" blocks or segments refer to crystalline or semi-crystalline blocks of polymerized units in which in some embodiments contain ethylene, preferably ethylene is present in an amount greater than about 80 mole percent, and preferably greater than 88 mole percent. In other words, the comonomer content in the hard segments is less than 20 mole percent, and preferably less than 12 weight percent. In some embodiments, the hard segments comprise all or substantially all ethylene. Such hard blocks are sometimes referred to herein as "rich polyethylene" blocks or segments.

"Soft" blocks or segments, on the other hand, refer to blocks of polymerized units in which the comonomer content is greater than 20 mole percent, preferably greater than 25 mole percent, up to 100 mole percent. In some embodiments, the comonomer content in the soft segments can be greater than 20 mole percent, greater than 25 mole percent, greater than 30 mole percent, greater than 35 mole percent, greater than 40 mole percent, greater than 45 mole percent, greater than 50 mole percent, or greater than 60 mole percent. "Soft" blocks or segments may refer to amorphous blocks or segments or with levels of crystallinity lower than that of the "hard" blocks or segments.

Additional embodiments include the invention poly(olefin monomer-olefin comonomer) block copolymers wherein at least one of the polymer blocks is amorphous ("soft" block) and at least one other polymer block is crystallizable ("hard" block). Preferably the difference between the expected $T_g$ (glass transition temperature, as measured by Differential Scanning calorimetry (DSC)) for the amorphous polymer block and $T_m$ (melt transition temperature, as measured by DSC) for the crystallizable polymer block is at least 40° C., more preferably at least 80° C., and still more preferably at least 100° C. Crystalline melting point (Tm) refers to the peak melting point determined by DSC according to ASTM D-3418 test method. Preferably, $T_m$ for the crystallizable polymer block is higher than the expected $T_g$ for the amorphous polymer block. More preferably, at least one block is crystalline or semicrystalline, having a crystalline melting point of at least 100° C., still more preferably at least 105° C., and even more preferably at least 120° C.; and at least one block is amorphous or non-crystalline. Also preferably, the heat of fusion associated with the melting point of any crystalline polymer block is at least 20 Joules per gram (J/g), preferably at least 40 J/g, and more preferably at least 50 J/g, as determined by DSC analysis. DSC analysis is according to the standard method described later. The invention also includes polymers in which crystallinity is induced or enhanced by the use of nucleating agents, thermal annealing, and/or strain. As used herein the term "expected" when used in reference to the properties of polymer entities are those properties predicted by the method for infinite molecular weight, room temperature (25° C.), atactic, polymer calculation disclosed in Jozef Bicerano, *Prediction of Polymer Properties*, 2nd ed., Marcel Dekker, Inc., New York (Bicerano technique). The technique is also incorporated into software, including SYNTHIA™, available from Molecular Simulations Inc., a subsidiary of Pharmacopeia, Inc. The expected properties of certain representative polymers calculated according to the Bicerano technique are found in Table 1 in WO 2008/027283 and corresponding U.S. patent application Ser. No. 12/377,034, filed Feb. 10, 2009. In some embodiments, the hard segments or blocks comprise all or at least 90 mole percent of an alpha-olefin. Such hard blocks may be referred to herein as "rich poly(alpha-olefin)" blocks or segments. The alpha-olefin comprising the hard rich poly(alpha-olefin) block may be, for example, polypropylene, poly(1-butene), or poly(4-methyl-1-pentene.

Preferred polyolefins include copolymers (e.g., ethylene/octene copolymers) having trade names ATTANE™ and AFFINITY™, and ENGAGE™ polyolefin elastomers, each available from The Dow Chemical Company, Michigan, USA; and olefin copolymers (e.g., ethylene/1-butene copolymers) made using INSITE® technology of The Dow Chemical Company.

The composition of formula (IVa), telechelic poly(olefin monomer-olefin comonomer) multiblock copolymer, poly (olefin monomer-olefin comonomer) multiblock copolymer, poly(olefin monomer-olefin comonomer)/polyester multi-block interpolymer poly(olefin monomer-olefin comonomer)/polyether multiblock interpolymer, poly(olefin monomer-olefin comonomer)/polyamide multiblock interpolymer, and poly(olefin monomer-olefin comonomer)/polyisocyanate multiblock interpolymer each comprise at least a portion that is a poly(olefin monomer-olefin comonomer). The poly(olefin monomer-olefin comonomer) comprises a plurality of repeat units, each repeat unit independently being a residual of the olefin monomer or comonomer, or a derivative of the residual of the olefin monomer or comonomer, the plurality of repeat units of the poly(olefin monomer-olefin comonomer) comprising a rich poly(olefin monomer) segment (i.e., comprising more residuals of the olefin monomer than residuals of the olefin comonomer, if any) and a different poly(olefin comonomer) segment (i.e., comprising a higher mole percent of residuals of the olefin comonomer than mole percent of residuals of the olefin comonomer, if any, in the poly(olefin monomer) segment).

Preferred invention poly(olefin monomer-olefin comonomer) is characterizable as being a multiblock interpolymer having blocks or segments of two or more polymerized monomer units differing in chemical or physical properties, and characterizable as being mesophase separated. Such polymers are sometimes referred to herein as "mesophase-separated olefin multiblock interpolymers." Preferably, each poly(olefin monomer-olefin comonomer) independently is characterizable as being mesophase separated and having a PDI of 1.4 or greater.

More preferably, each poly(olefin monomer-olefin comonomer) independently is a poly(ethylene alpha-olefin). The poly(ethylene alpha-olefin) comprises an ethylene-derived hard segment and a soft segment comprising residuals from the alpha-olefin and ethylene. Where poly(ethylene alpha-olefin) comprises a rich polyethylene segment, crystallization of such rich polyethylene segment is primarily constrained to resulting mesodomains and such poly(ethylene alpha-olefin) may be referred to as "mesophase separated."

Preferably, the poly(ethylene alpha-olefin) independently is characterizable as being mesophase separated and having a PDI of from 1.4 to 8. Preferably, each such PDI is characterizable as fitting a Schutz-Flory distribution rather than a Poisson distribution. Preferably, each poly(ethylene alpha-olefin) independently is characterizable as having both a polydisperse block distribution as well as a polydisperse distribution of block sizes, which characteristics impart improved and distinguishable physical properties thereto. Also preferably, each poly(ethylene alpha-olefin) independently is characterizable as having a difference in mole percent of alpha-olefin content between the polyethylene and other blocks.

As used herein, the term "mesophase separation" means a process in which polymeric blocks are locally segregated to form ordered domains. These mesodomains can take the form of spheres, cylinders, lamellae, or any other morphology known for block copolymers.

Sizes of domains of the mesophase-separated olefin multiblock interpolymer can be controlled by varying molecular weight of the mesophase-separated olefin multiblock interpolymer or changing the difference in comonomer content of the mesophase-separated olefin multiblock interpolymer. Sizes of the domains can also be modified by blending a blend component with bulk mesophase-separated olefin multiblock interpolymer. Examples of suitable blend components include homopolymer or copolymer with similar composition as one of the respective blocks or segments of the mesophase-separated olefin multiblock interpolymer, an oil such as mineral oil, and a solvent (used as a diluent) such as toluene or hexane.

In some embodiments, the domains of the mesophase-separated olefin multiblock interpolymer are characterizable as having a size that is at least 50% larger than domain sizes in conventional monodisperse (i.e., PDI less than 2, e.g., PDI about 1) block copolymers. Sizes of the domains can be controlled by varying the molecular weight of the mesophase-separated olefin multiblock interpolymers or changing comonomer content thereof such that at least two blocks (i.e., the hard and soft segments) of the mesophase-separated olefin multiblock interpolymer differ thereby. The desired amounts of comonomer may be measured in mole percent. A calculation may be made for any desired comonomer in order to determine the amount required to achieve mesophase separation.

Domain sizes of the mesophase-separated olefin multiblock interpolymer are typically in the range of from about 40 nanometers (nm) to about 300 nm. The mesophase-separated olefin multiblock interpolymers comprise olefin block copolymers wherein the amount of comonomer in the soft segments as compared to that in the hard segments is such that the mesophase-separated olefin multiblock interpolymer undergoes mesophase separation in a melt thereof.

In some embodiments, the polyolefin comprises an ethylene/alpha-olefin interpolymer, such as those described in PCT International Patent Application Publication Number WO 2009/097560, which is herein incorporated by reference, preferably a block copolymer, which comprises a hard segment and a soft segment, and is characterized by a $M_w/M_n$ in the range of from about 1.4 to about 2.8 and:

(a) has at least one $T_m$ (° C.), and a density (d) in grams/cubic centimeter, wherein the numerical values of $T_m$ and d correspond to the relationship:

$$T_m > -6553.3 + 13735(d) - 7051.7(d)^2, \text{ or}$$

(b) is characterized by a heat of fusion ($\Delta H$, in J/g), and a delta temperature quantity ($\Delta T$, in ° C.), defined as the temperature difference between the tallest differential scanning calorimetry (DSC) peak and the tallest crystallization analysis fractionation (CRYSTAF) peak, wherein the numerical values of $\Delta T$ and $\Delta H$ have the following relationships:

$$\Delta T > -0.1299(\Delta H) + 62.81 \text{ for } \Delta H \text{ greater than zero (0)}$$
$$\text{and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery ($R_e$) in percent at 300 percent strain and 1 cycle measured with a compression-molded film of the ethylene/alpha-olefin interpolymer, and has a density d in grams/cubic centimeter, wherein the numerical values of $R_e$ and d satisfy the following relationship when ethylene/alpha-olefin interpolymer is substantially free of a cross-linked phase:

$$R_e > 1481 - 1629(d); \text{ or}$$

(d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/alpha-olefin interpolymer; or (e) has a storage modulus at 25° C. (G'(25° C.)) and a storage modulus at 100° C. (G' (100° C.)) wherein the ratio of G'(25° C.) to G'(100° C.) is in the range of about 1:1 to about 9:1; or (f) is characterized by an average block index greater than zero (0) and up to about 1.0; or (g) has a molecular fraction which elutes between 40° C. and 130° C. when fractionated using TREF, characterized in that the fraction has a molar comonomer content greater than, or equal to, the quantity (−0.2013) T+20.07, more preferably greater than or equal to the quantity (−0.2013) T+21.07, where T is the numerical value of the peak elution temperature of the TREF fraction, measured in ° C.; and, wherein the ethylene/alpha-olefin block interpolymer is mesophase separated.

In some embodiments, the polyolefin comprises an ethylene/alpha-olefin interpolymer, such as that described in U.S. Pat. No. 7,355,089 and U.S. Patent Application Publication No. US 2006-0199930, wherein the interpolymer is preferably a block copolymer, and comprises a hard segment and a soft segment, and the ethylene/alpha-olefin interpolymer:

(a) has an $M_w/M_n$ from about 1.7 to about 3.5, at least one $T_m$ (° C.), and a density d, in grams/cubic centimeter, wherein the numerical values of $T_m$ and d correspond to the relationship:

$$Tm > -2002.9 + 4538.5(d) - 2422.2(d)_2; \text{ or}$$

(b) has a $M_w/M_n$ from about 1.7 to about 3.5, and is characterized by a heat of fusion, ΔH in J/g, and a delta quantity, ΔT (° C.), defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an $R_e$ in percent at 300 percent strain and 1 cycle measured with a compression-molded film of the ethylene/alpha-olefin interpolymer, and has a density, d, in grams/cubic centimeter, wherein the numerical values of $R_e$ and d satisfy the following relationship when ethylene/alpha-olefin interpolymer is substantially free of a cross-linked phase:

$$R_e > 1481 - 1629(d); \text{ or}$$

(d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/alpha-olefin interpolymer; or (e) has a storage modulus at 25° C. (G'(25° C.)), and a storage modulus at 100° C., (G'(100° C.)), wherein the ratio of G'(25° C.) to G'(100° C.) is in the range of about 1:1 to about 9:1 or (f) has a molecular fraction which elutes between 40° C. and 130° C. when fractionated using TREF, characterized in that the fraction has a block index of at least 0.5 and up to about 1 and a $M_w/M_n$ greater than about 1.3; or (g) has an average block index greater than zero (0) and up to about 1.0 and a $M_w/M_n$ greater than about 1.3; or (h) has a molecular fraction which elutes between 40° C. and 130° C. when fractionated using TREF, characterized in that the fraction has a molar comonomer content greater than, or equal to, the quantity (−0.2013) T+20.07, more preferably greater than or equal to the quantity (−0.2013) T+21.07, where T is the numerical value of the peak elution temperature of the TREF fraction, measured in ° C.

Other embodiments comprise polymers and processes such as those described in PCT International Patent Application Publication Nos. WO 2005/090425 A1 and its corresponding US 2007/0167315 A1, WO 2005/090426 A1 and its corresponding US 2008/0311812 A1, and WO 2005/090427 A2 and its corresponding US 2007/0167578 A1.

In other embodiments, the instant block interpolymers are poly(ethylene alpha-olefin) copolymers and related processes and methods described in PCT International Patent Application Publication Number WO 2009/097565, wherein:

(a) the poly(ethylene alpha-olefin) copolymer comprises two or more substantially homogeneous intramolecular blocks comprising differing chemical or physical properties and having a difference in mole percent α-olefin content, said intramolecular blocks characterized by possessing a most probable molecular weight distribution, wherein at least one poly(ethylene alpha-olefin) copolymer (i.e., ethylene/α-olefin interpolymer) is characterized by a molecular weight distribution, $M_w/M_n$, in the range of from about 1.4 to about 2.8 and by an average block index greater than zero and up to about 1.0; and, wherein the ethylene/α-olefin block interpolymer is mesophase separated; or (b) the poly(ethylene alpha-olefin) copolymer comprises two or more substantially homogeneous intramolecular blocks comprising differing chemical or physical properties and having a difference in mole percent α-olefin content, said intramolecular segments characterized by possessing a most probable molecular weight distribution, wherein the block copolymer has a molecular weight of 1,000 g/mole to 1,000,000 g/mole and is mesophase separated; or (c) the poly(ethylene alpha-olefin) copolymer comprises two or more substantially homogeneous intramolecular blocks comprising differing chemical or physical properties and having a difference in mole percent α-olefin content, said intramolecular segments characterized by possessing a most probable molecular weight distribution wherein the copolymer is characterized by an average molecular weight of greater than 40,000 g/mol, a molecular weight distribution, Mw/Mn, in the range of from about 1.4 to about 2.8, and a difference in mole percent α-olefin content between the intramolecular blocks of greater than about 20 mole percent.

Monomer and comonomer content of the polyolefins may be measured using any suitable technique such as, for example, infrared (IR) spectroscopy and nuclear magnetic resonance (NMR) spectroscopy, with techniques based on NMR spectroscopy being preferred and carbon-13 NMR spectroscopy being more preferred. To use carbon-13 NMR spectroscopy, prepare an analysis sample from a polymer sample of the high density polyethylene or poly(ethylene alpha-olefin) block copolymer by adding approximately 3 g of a 50/50 mixture of tetrachloroethane-$d^2$/orthodichlorobenzene to 0.4 g of the polymer sample in a 10 millimeter (mm) NMR tube. Dissolve and homogenize the polymer sample by heating the tube and its contents to 150° C. Collect carbon-13 NMR spectroscopy data using a JEOL Eclipse™ 400 MHz spectrometer or a Varian Unity Plus™ 400 MHz spectrometer, corresponding to a carbon-13 resonance frequency of 100.5 MHz. Acquire the carbon-13 data using 4000 transients per data file with a 6 second pulse repetition delay. To achieve minimum signal-to-noise for quantitative analysis, add multiple data files together. The spectral width is 25,000 Hz with a minimum file size of 32,000 data points. Analyze the analysis sample at 130° C. in a 10 mm broad band probe. Determine the comonomer incorporation with the carbon-13 data using Randall's triad method (Randall, J. C.; JMS-Rev. Macromol. Chem. Phys., C29, 201-317 (1989), which is incorporated by reference herein in its entirety.

In some embodiments, the amount of olefin comonomer incorporated into the poly(olefin monomer-olefin comonomer) block copolymer or segments thereof is characterized by a comonomer incorporation index. As used herein, the term, "comonomer incorporation index", refers to the mole percent of residuals of olefin comonomer incorporated into olefin monomer/comonomer copolymer, or segment thereof, prepared under representative olefin polymerization conditions. Preferably, the olefin monomer is ethylene or propylene and the comonomer respectively is an $(C_3-C_{40})$alpha-olefin or $(C_4-C_{40})$alpha-olefin. The olefin polymerization conditions are ideally under steady-state, continuous solution polymerization conditions in a hydrocarbon diluent at 100° C., 4.5 megapascals (MPa) ethylene (or propylene) pressure (reactor pressure), greater than 92 percent (more preferably greater than 95 percent) olefin monomer conversion, and greater than 0.01 percent olefin comonomer conversion. The selection of catalyst compositions, which include the invention multifunctional compositions, having the greatest difference in olefin comonomer incorporation indices results in poly(olefin monomer-olefin comonomer) block copolymers from two or more olefin monomers having the largest difference in block or segment properties, such as density.

In certain circumstances the comonomer incorporation index may be determined directly, for example by the use of NMR spectroscopic techniques described previously or by IR spectroscopy. If NMR or IR spectroscopic techniques cannot be used, then any difference in comonomer incorporation is indirectly determined For polymers formed from multiple monomers this indirect determination may be accomplished by various techniques based on monomer reactivities.

For copolymers produced by a given catalyst, the relative amounts of comonomer and monomer in the copolymer and hence the copolymer composition is determined by relative rates of reaction of comonomer and monomer. Mathematically the molar ratio of comonomer to monomer is given by the equations described in US 2007/0167578 A1, in paragraphs numbered [0081] to [0090].

For this model as well the polymer composition is a function only of temperature dependent reactivity ratios and comonomer mole fraction in the reactor. The same is also true when reverse comonomer or monomer insertion may occur or in the case of the interpolymerization of more than two monomers.

Reactivity ratios for use in the foregoing models may be predicted using well known theoretical techniques or empirically derived from actual polymerization data. Suitable theoretical techniques are disclosed, for example, in B. G. Kyle, *Chemical and Process Thermodynamics*, Third Addition, Prentice-Hall, 1999 and in Redlich-Kwong-Soave (RKS) Equation of State, Chemical *Engineering Science,* 1972, pp 1197-1203. Commercially available software programs may be used to assist in deriving reactivity ratios from experimentally derived data. One example of such software is *Aspen Plus from* Aspen Technology, Inc., Ten Canal Park, Cambridge, Mass. 02141-2201 USA.

At times it is convenient to incorporate by reference examples of the original and associate olefin polymerization catalysts. For convenience and consistency, one of the original and associate olefin polymerization catalysts is thus sometimes referred to herein as a "first olefin polymerization catalyst" and one as a "second olefin polymerization catalyst." That is, in some embodiments, the first olefin polymerization catalyst is the same as the original olefin polymerization catalyst and the second olefin polymerization catalyst is the same as the associate olefin polymerization catalyst; and vice versa in other embodiments. As used herein, the first olefin polymerization catalyst is characterizable as having a high comonomer incorporation index and the second olefin polymerization catalyst is characterizable as having a comonomer incorporation index that is less than 95 percent of the high comonomer incorporation index. Preferably, the second olefin polymerization catalyst is characterized as having a comonomer incorporation index that is less than 90 percent, more preferably less than 50 percent, still more preferably less than 25 percent, and even more preferably less than 10 percent of the high comonomer incorporation index of the first olefin polymerization catalyst.

In some embodiments, the invention process employs a catalyst system comprising a mixture or reaction product of:

(A) a first olefin polymerization catalyst, the first olefin polymerization catalyst being characterized as having a high comonomer incorporation index (e.g., a comonomer incorporation index of 15 mole percent of comonomer or higher);

(B) a second olefin polymerization catalyst, the second olefin polymerization catalyst being characterized as having a comonomer incorporation index that is less than 90 percent of the comonomer incorporation index of the first olefin polymerization catalyst; and (C) the invention multifunctional chain shuttling agent;

In some embodiments, the original olefin polymerization catalyst is the first olefin polymerization catalyst and the associate olefin polymerization catalyst is the second olefin polymerization catalyst. In some embodiments, the original olefin polymerization catalyst is the second olefin polymerization catalyst and the associate olefin polymerization catalyst is the first olefin polymerization catalyst.

The term "catalyst" as generally used herein may refer to an unactivated form of a metal-ligand complex (i.e., precursor) or, preferably, the activated form thereof (e.g., after contact of the unactivated form with an activating cocatalyst to give a catalytically active mixture or product thereof). The metal of the metal-ligand complex can be a metal of any one of Groups 3 to 15, preferably Group 4, of the Periodic Table of the Elements. Examples of types of suitable metal-ligand complexes are metallocene, half-metallocene, constrained geometry, and polyvalent pyridylamine-, polyether-, or other polychelating base complexes. Such metal-ligand complexes are described in the WO 2008/027283 and corresponding U.S. patent application Ser. No. 12/377,034. Other suitable metal-ligand complexes are those described in U.S. Pat. No. 5,064,802; U.S. Pat. No. 5,153,157; U.S. Pat. No. 5,296,433; U.S. Pat. No. 5,321,106; U.S. Pat. No. 5,350,723; U.S. Pat. No. 5,425,872; U.S. Pat. No. 5,470,993; U.S. Pat. No. 5,625,087; U.S. Pat. No. 5,721,185; U.S. Pat. No. 5,783,512; U.S. Pat. No. 5,866,704; U.S. Pat. No. 5,883,204; U.S. Pat. No. 5,919,983; U.S. Pat. No. 6,015,868; U.S. Pat. No. 6,034,022; U.S. Pat. No. 6,103,657; U.S. Pat. No. 6,150,297; U.S. Pat.

No. 6,268,444; U.S. Pat. No. 6,320,005; U.S. Pat. No. 6,515,155; U.S. Pat. No. 6,555,634; U.S. Pat. No. 6,696,379; U.S. Pat. No. 7,163,907; and U.S. Pat. No. 7,355,089, as well as in applications WO 02/02577; WO 02/92610; WO 02/38628; WO 03/40195; WO 03/78480; WO 03/78483; WO 2009/012215 A2; US 2003/0004286; and US 04/0220050; US 2006/0199930 A1; US 2007/0167578 A1; and US 2008/0311812 A1.

Also for convenience and consistency, the "first olefin polymerization catalyst" is interchangeably referred to herein as "Catalyst (A)." The "second olefin polymerization catalyst" is interchangeably referred to herein as "Catalyst (B)." The first and second olefin polymerization catalysts preferably have different ethylene and $(C_3-C_{40})$alpha-olefin selectivities.

Preferably, the comonomer incorporation index of Catalyst (B) is less than 50 percent and more preferably less than 5 percent of the comonomer incorporation index of Catalyst (A). Preferably, the comonomer incorporation index for Catalyst (A) is greater than 20 mol %, more preferably greater than 30 mol %, and still more preferably greater than 40 mol % incorporation of comonomer.

Preferably the Catalyst (A) of the catalyst system independently is a Catalyst (A) described in US 2006/0199930 A1; US 2007/0167578 A1; US 2008/0311812 A1; U.S. Pat. No. 7,355,089 B2; or WO 2009/012215 A2. Also preferably the Catalyst (B) of the catalyst system independently is a Catalyst (B) described in US 2006/0199930 A1; US 2007/0167578 A1; US 2008/0311812 A1; U.S. Pat. No. 7,355,089 B2; or WO 2009/012215 A2. More preferred are the catalysts described in US 2007/0167578 A1, paragraphs numbered [0138] to [0476].

Representative Catalysts (A) and (B) are the catalysts of formulas (A1) to (A5), (B1), (B2), (C1) to (C3), and (D1):

Catalyst (A1) is [N-(2,6-di(1-methylethyl)phenyl)amido)(2-isopropylphenyl)(α-naphthalen-2-diyl(6-pyridin-2-diyfimethane)]hafnium dimethyl, prepared according to the teachings of WO 03/40195, 2003US0204017, U.S. Ser. No. 10/429,024, filed May 2, 2003, and WO 04/24740, and having the structure:

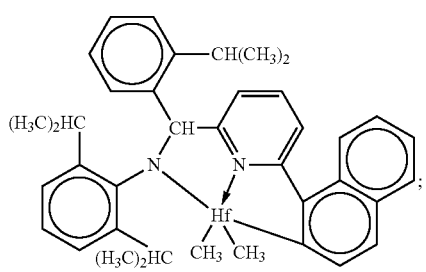

(A1)

Catalyst (A2) is [N-(2,6-di(1-methylethyl)phenyl)amido)(2-methylphenyl)(1,2-phenylene-(6-pyridin-2-diyfimethane)]hafnium dimethyl, prepared according to the teachings of WO 03/40195, 2003US0204017, U.S. Ser. No. 10/429,024, filed May 2, 2003, and WO 04/24740, and having the structure:

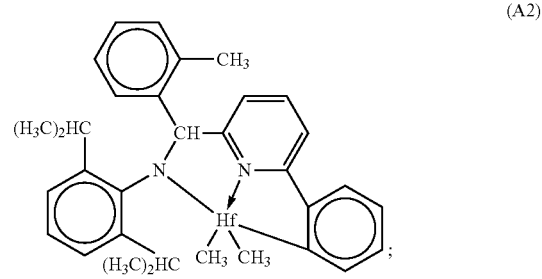

(A2)

Catalyst (A3) is bis[N,N'''-(2,4,6-tri(methylphenyliamido)ethylenediamine]hafnium dibenzyl, and having the structure:

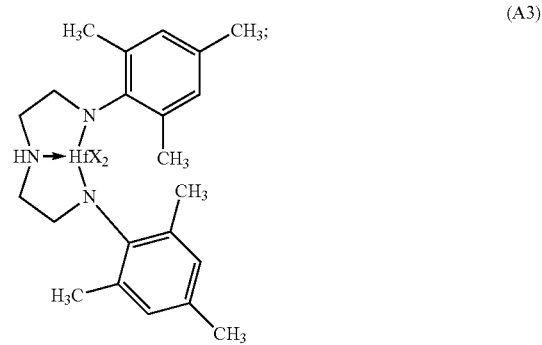

(A3)

$X = CH_2C_6H_5$

Catalyst (A4) is bis((2-oxoyl-3-(dibenzo-1H-pyrrole-1-yl)-5-(methyliphenyl)-2-phenoxymethylicyclohexane-1,2-diyl zirconium (IV) dibenzyl, prepared substantially according to the teachings of US-A-2004/0010103, and having the structure:

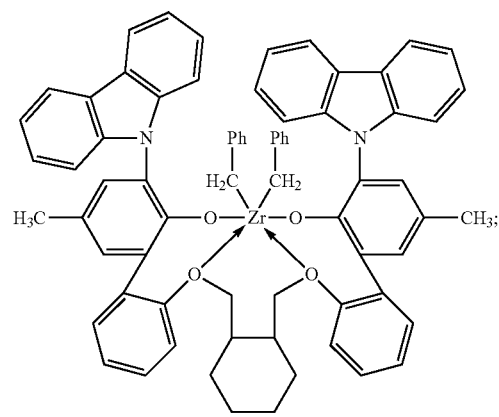

(A4)

Catalyst (A5) is [η²-2,6-diisopropyl-N-(2-methyl-3-(octylimino)butan-2-yl)benzeneamide]trimethylhafnium, prepared substantially according to the teachings of WO 2003/051935, and having the structure:

(A5)

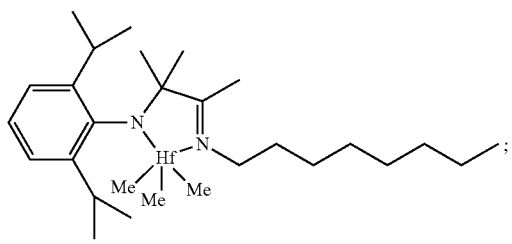

Catalyst (B1) is 1,2-bis-(3,5-di-t-butylphenylene)(1-(N-(1-methylethyl)imino)methyl)(2-oxoyl)zirconium dibenzyl, and having the structure:

(B1)

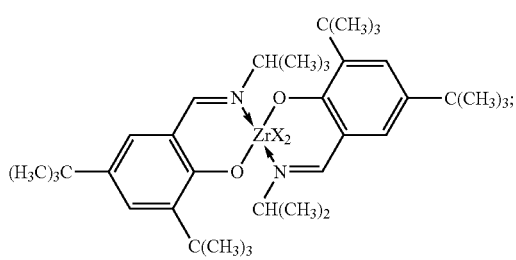

X = CH₂C₆H₅

Catalyst (B2) is 1,2-bis-(3,5-di-t-butylphenylene)(1-(N-(2-methylcyclohexyl)-imino)methyl)(2-oxoyl)zirconium dibenzyl, and having the structure:

(B2)

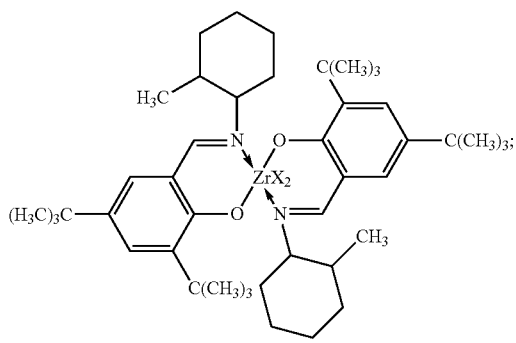

X = CH₂C₆H₅

Catalyst (C1) is (t-butylamido)dimethyl(3-N-pyrrolyl-1,2,3,3a,7a-η-inden-1-yl)silanetitanium dimethyl, prepared substantially according to the techniques of U.S. Pat. No. 6,268,444, and having the structure:

(C1)

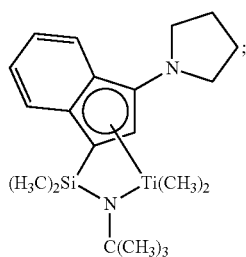

Catalyst (C2) is (t-butylamido)di(4-methylphenyl) (2-methyl-1,2,3,3a,7a-η-inden-1-yl)silanetitanium dimethyl, prepared substantially according to the teachings of US-A-2003/004286, and having the structure:

(C2)

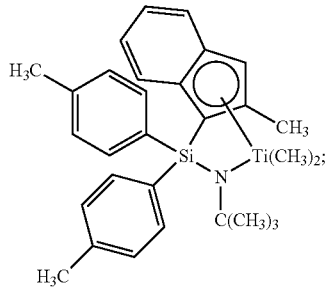

Catalyst (C3) is (t-butylamido)di(4-methylphenyl)(2-methyl-1,2,3,3a,8a-η-s-indacen-1-yl)silanetitanium dimethyl, prepared substantially according to the teachings of US-A-2003/004286, and having the structure:

(C3)

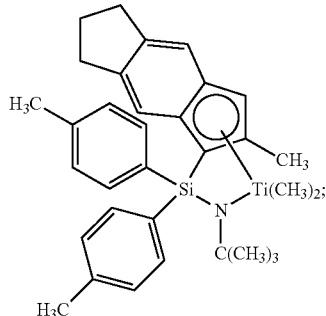

and

Catalyst (D1) is bis(dimethyldisiloxane)(indene-1-yl)zirconium dichloride, available from Sigma-Aldrich, and having the structure:

(D1)

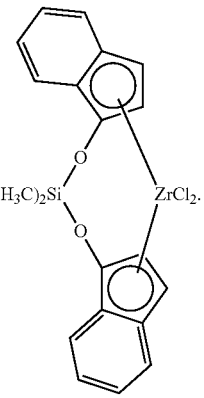

In some embodiments, the original and associate olefin polymerization catalysts are rendered catalytically active by contacting them to, or reacting them with, a same cocatalyst (sometimes referred to as an activating cocatalyst or co-catalyst) or by using an activating technique such as those that are known in the art for use with metal (e.g., Group 4) olefin polymerization reactions. For example, some embodiments employing both the original and associate olefin polymerization catalysts further employ only the original cocatalyst. In other embodiments, the original cocatalyst is used to activate the original olefin polymerization catalyst and the associate cocatalyst is used to activate associate olefin polymerization catalyst.

Suitable cocatalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis (explained in more detail hereinafter). Combinations of one or more of the foregoing cocatalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Aluminoxanes and their preparations are known at, for example, U.S. Pat. No. 6,103,657. Examples of preferred polymeric or oligomeric alumoxanes are methylalumoxane, triisobutylaluminum-modified methylalumoxane, and isobutylalumoxane.

Preferred Lewis acid cocatalysts are Group 13 metal compounds containing from 1 to 3 hydrocarbyl substituents as described herein. More preferred Group 13 metal compounds are tri(hydrocarbyl)-substituted-aluminum or tri(hydrocarbyl)-boron compounds, still more preferred are tri(($C_1$-$C_{10}$) alkyl)aluminum or tri(($C_6$-$C_{18}$)aryl)boron compounds and halogenated (including perhalogenated) derivatives thereof, even more especially tris(fluoro-substituted phenyl)boranes, still even more especially tris(pentafluorophenyl)borane. In some embodiments, the cocatalyst is a tris(($C_1$-$C_{20}$)hydrocarbyl)borate (e.g., trityl tetrafluoroborate) or a tri(($C_1$-$C_{20}$)hydrocarbyl)ammonium tetra(($C_1$-$C_{20}$)hydrocarbyl)borane (e.g., bis(octadecyl)methylammonium tetrakis(pentafluorophenyl)borane). As used herein, the term "ammonium" means a nitrogen cation that is a (($C_1$-$C_{20}$)hydrocarbyl)$_4$N$^+$, a (($C_1$-$C_{20}$)hydrocarbyl)$_3$N(H)$^+$, a (($C_1$-$C_{20}$)hydrocarbyl)$_2$N(H)$_2^+$, ($C_1$-$C_{20}$)hydrocarbylN(H)$_3^+$, or N(H)$_4^+$, wherein each ($C_1$-$C_{20}$)hydrocarbyl may be the same or different.

Preferred combinations of neutral Lewis acid cocatalysts include mixtures comprising a combination of a tri(($C_1$-$C_4$) alkyl)aluminum and a halogenated tri(($C_6$-$C_{18}$)aryl)boron compound, especially a tris(pentafluorophenyl)borane. Also preferred are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Preferred ratios of numbers of moles of (metal-ligand complex):(tris(pentafluoro-phenylborane):(alumoxane) [e.g., (Group 4 metal-ligand complex):(tris(pentafluorophenylborane):(alumoxane)] are from 1:1:1 to 1:10:30, more preferably from 1:1:1.5 to 1:5:10.

Many cocatalysts and activating techniques have been previously taught with respect to different metal-ligand complexes in the following USPNs: U.S. Pat. No. 5,064,802; U.S. Pat. No. 5,153,157; U.S. Pat. No. 5,296,433; U.S. Pat. No. 5,321,106; U.S. Pat. No. 5,350,723; U.S. Pat. No. 5,425,872; U.S. Pat. No. 5,625,087; U.S. Pat. No. 5,721,185; U.S. Pat. No. 5,783,512; U.S. Pat. No. 5,883,204; U.S. Pat. No. 5,919,983; U.S. Pat. No. 6,696,379; and U.S. Pat. No. 7,163,907. Examples of suitable hydrocarbyloxides are disclosed in U.S. Pat. No. 5,296,433. Examples of suitable Bronsted acid salts for addition polymerization catalysts are disclosed in U.S. Pat. No. 5,064,802; U.S. Pat. No. 5,919,983; U.S. Pat. No. 5,783,512. Examples of suitable salts of a cationic oxidizing agent and a non-coordinating, compatible anion as cocatalysts for addition polymerization catalysts are disclosed in U.S. Pat. No. 5,321,106. Examples of suitable carbenium salts as cocatalysts for addition polymerization catalysts are disclosed in U.S. Pat. No. 5,350,723. Examples of suitable silylium salts as cocatalysts for addition polymerization catalysts are disclosed in U.S. Pat. No. 5,625,087. Examples of suitable complexes of alcohols, mercaptans, silanols, and oximes with tris(pentafluorophenyl)borane are disclosed in U.S. Pat. No. 5,296,433. Some of these catalysts are also described in a portion of U.S. Pat. No. 6,515,155 B1 beginning at column 50, at line 39, and going through column 56, at line 55, only the portion of which is incorporated by reference herein.

In some embodiments, one or more of the foregoing cocatalysts are used in combination with each other. An especially preferred combination is a mixture of a tri(($C_1$-$C_4$) hydrocarbyl)aluminum, tri(($C_1$-$C_4$)hydrocarbyl)borane, or an ammonium borate with an oligomeric or polymeric alumoxane compound.

The ratio of total number of moles of the original and associate olefin polymerization catalysts to total number of moles of one or more of the cocatalysts is from 1:10,000 to 100:1. Preferably, the ratio is at least 1:5000, more preferably at least 1:1000; and 10:1 or less, more preferably 1:1 or less. When an alumoxane alone is used as the cocatalyst, preferably the number of moles of the alumoxane that are employed is at least 100 times the number of moles of the original and associate olefin polymerization catalysts. When tris(pentafluorophenyl)borane alone is used as the cocatalyst, preferably the number of moles of the tris(pentafluorophenyl)borane that are employed to the total number of moles of one or more original and associate olefin polymerization catalysts form 0.5:1 to 10:1, more preferably from 1:1 to 6:1, still more preferably from 1:1 to 5:1. The remaining cocatalysts are generally employed in approximately mole quantities equal to the total mole quantities of one or more original and associate olefin polymerization catalysts.

The term "catalyst preparing conditions" independently refers to reaction conditions such as solvent(s), atmosphere(s), temperature(s), pressure(s), time(s), and the like that are preferred for giving at least a 10 percent (%), more preferably at least 20%, and still more preferably at least 30% reaction yield of the catalyst from the relevant invention process of after 2 hours reaction time. Preferably, the relevant invention process independently is run under an inert atmosphere (e.g., under an inert gas consisting essentially of, for example, nitrogen gas, argon gas, helium gas, or a mixture of any two or more thereof). Preferably, the relevant invention process is run with an aprotic solvent or mixture of two or more aprotic solvents, e.g., toluene. Preferably, the relevant invention process is run as a reaction mixture comprising the aprotic solvent. The reaction mixture may comprise additional ingredients such as those described previously herein. Preferably, the relevant invention process is run at a temperature of the reaction mixture of from −20° C. to about 200° C. In some embodiments, the temperature is at least 0° C., and more preferably at least 20° C. In other embodiments, the temperature is 100° C. or lower, more preferably 50° C. or lower, and still more preferably 40° C. or lower. A convenient temperature is about ambient temperature, i.e., from about 20° C. to about 30° C. Preferably the relevant invention process independently is run at ambient pressure, i.e., at about 1 atm (e.g., from about 95 kPa to about 107 kPa, such as 101 kPa).

The term "catalytic amount" means mole percent (mol %) of the catalyst for a catalyzed reaction that is less than 100 mol % of a number of moles of a product-limiting stoichiometric reactant employed in the catalyzed reaction and equal to or greater than a minimum mol % value that is necessary for at least some product of the catalyzed reaction to be formed and detected (e.g., by mass spectrometry), wherein 100 mol % is equal to the number of moles of the product-limiting stoichiometric reactant employed in the catalyzed reaction. The minimum catalytic amount preferably is 0.000001 mol %, and may be 0.00001 mol %, 0.0001 mol %, 0.001 mol %, or even 0.01 mol %. Preferably, the catalytic amount of each of the olefin polymerization catalysts independently is from 0.00001 mol % to 50 mol % of the moles of olefin monomer or comonomer, whichever is lower.

A general process for making polyolefins that can be adapted for making the polyolefins of the present invention (e.g., poly(olefin monomer-olefin comonomer) block copolymers) has been disclosed in PCT Publication No. WO 2007/035485 A1. For example, one such method comprises a process for the polymerization of one or more addition polymerizable monomers, preferably of two or more addition polymerizable monomers, especially ethylene and at least one copolymerizable comonomer, propylene and at least one copolymerizable comonomer having from 4 to 20 carbons, or 4-methyl-1-pentene and at least one different copolymerizable comonomer having from 4 to 20 carbons, to form a copolymer comprising two regions or segments of differentiated polymer composition or properties, especially regions comprising differing comonomer incorporation index, said process comprising:

contacting an addition polymerizable monomer or mixture of monomers under addition polymerization conditions, preferably uniform or homogeneous polymerization conditions, in a reactor or reactor zone with a composition comprising at least one olefin polymerization catalyst and at least one cocatalyst and characterized by the formation of polymer segments from said monomer or monomers;

transferring the reaction mixture to a second reactor or reactor zone and optionally adding one or more additional reactants, catalysts, monomers or other compounds prior to, contemporaneously with, or after said transfer; and causing polymerization to occur in said second reactor or reactor zone to form polymer segments that are differentiated from the polymer segments formed in step 1);

said process being characterized by addition of a chain shuttling agent to the reaction mixture prior to, during, or subsequent to step 1) such that at least some of the resulting polymer molecules from step 3) comprises two or more chemically or physically distinguishable blocks or segments. As mentioned previously, a characteristic of the invention multifunctional chain shuttling agent is that it comprises a single compound that is capable of functioning in such a way that at least one olefin-containing polymeryl chain can be shuttled between two or more olefin polymerization catalysts. As a test, such polymeryl chain shuttling preferably is characterized with a process of preparing a poly(ethylene octene) diblock copolymer, the process comprising the above listed steps and operated at representative olefin polymerization conditions (described later herein), ideally under steady-state, continuous solution polymerization conditions in a hydrocarbon diluent at 100° C., 4.5 megapascals (MPa) ethylene pressure (reactor pressure), greater than 92 percent (more preferably greater than 95 percent) ethylene conversion, and greater than 0.01 percent comonomer (i.e., 1-octene) conversion. Preferably, the process employs two olefin polymerization catalysts, one of which being catalyst (A1). The entire process for producing the block copolymers can also be carried out in a single reactor.

While the foregoing process has been described for convenience as forming a diblock version of the invention poly (olefin monomer-olefin comonomer) block copolymer, it is an additional object of the invention to prepare poly(olefin monomer-olefin comonomer) block copolymers having 3 or more blocks. The invention poly(olefin monomer-olefin comonomer) block copolymers having 3 or more blocks also includes hyper-branched or dendrimeric copolymers. Such copolymers having 3 or more blocks can be prepared through coupling of the poly(olefin monomer-olefin comonomer) of the poly(olefin monomer-olefin comonomer)-containing multifunctional chain shuttling agent (e.g., as in the composition of formula (IVa)) exiting the second reactor or zone (or any subsequent reactor or zone) using a polyfunctional (e.g., difunctional) coupling agent, the coupling agent being trifunctional or higher for preparing the hyper-branched or dendrimeric copolymers. Further, if more than two reactors are employed, the invention poly(olefin monomer-olefin comonomer) block copolymer having three or more blocks resembles what could be made instead by living polymerization in more than one reactor, with a difference being that each block of the former poly(olefin monomer-olefin comonomer) block copolymer having three or more blocks possesses characteristics of a most probable distribution of molecular weights and composition while the blocks of the latter living polymerization product would not possess such characteristics. In particular, the polydispersity of the invention poly (olefin monomer-olefin comonomer) block copolymer having three or more blocks is generally less than 2.4 and can approach 1.5 for product made in two reactors.

In general, the average number of blocks in the absence of the polyfunctional coupling agent-facilitated coupling of the poly(olefin monomer-olefin comonomer) block copolymer polymers will be equal to the number of reactors employed. The poly(olefin monomer-olefin comonomer) block copolymer products will normally include quantities of conventional polymer depending on the efficiency of the particular multifunctional chain shuttling agent (and optionally additional chain shuttling agents, if any) employed under the conditions of the polymerization.

The invention involves the concept of using multifunctional chain shuttling as a way to prolong the lifetime of (i.e., safe keep) a polymer chain such that a substantial fraction of the polymer chains exit at least a first reactor of a multiple reactor series or a first reactor zone in a multiple zoned reactor operating substantially under plug flow conditions in the form of polymer chains terminated with the multifunctional chain shuttling agent (e.g., as in the composition of formula (IV) or (IVa)), and the polymer chains experience different polymerization conditions in the next reactor or polymerization zone. Different polymerization conditions in the respective reactors or zones include the use of different monomers, comonomers, or monomer/comonomer(s) ratio, different polymerization temperatures, pressures or partial pressures of various monomers, different catalysts, differing monomer gradients, or any other difference leading to formation of a distinguishable polymer segment. Thus, at least a portion of the polymer resulting from the present process comprises two, three, or more, preferably two or three, differentiated polymer segments arranged intramolecularly.

Because the various reactors or zones form a distribution of polymers rather than a single specific polymer composition, the resulting product has improved properties over a random copolymer or monodisperse block copolymer.

As mentioned previously, the poly(olefin monomer-olefin comonomer) block copolymers are prepared under olefin polymerizing conditions. Olefin polymerizing conditions independently refer to reaction conditions such as solvent(s), atmosphere(s), temperature(s), pressure(s), time(s), and the like that are preferred for giving at least a 10 percent (%), more preferably at least 20%, and still more preferably at least 30% reaction yield of the polyolefin or poly(olefin monomer-olefin comonomer) block copolymer after 15 minutes reaction time. Preferably, the polymerization processes independently are run under an inert atmosphere (e.g., under an inert gas consisting essentially of, for example, nitrogen gas, argon gas, helium gas, or a mixture of any two or more thereof). Other atmospheres are contemplated, however, and these include sacrificial olefin in the form of a gas and hydrogen gas (e.g., as a polymerization termination agent). In some aspects, the polymerization processes independently are run without any solvent, i.e., is a neat polymerization process that is run in a neat mixture of aforementioned ingredients. In other aspects, the neat mixture further contains additional ingredients (e.g., catalyst stabilizer such as triphenylphosphine) other than solvent(s). In still other aspects, the polymerization processes independently are run with a solvent or mixture of two or more solvents, i.e., is a solvent-based process that is run as a solvent-containing mixture of aforementioned ingredients, and at least one solvent, e.g., an aprotic solvent. Preferably, the neat polymerization process or solvent-based polymerization process is run at a temperature of the neat mixture or solvent-containing mixture of from −20° C. to about 250° C., and more preferably from −20° C. to about 200° C. In some embodiments, the temperature is at least 30° C., and more preferably at least 40° C. In other embodiments, the temperature is 175° C. or lower, more preferably 150° C. or lower, and still more preferably 140° C. or lower. A convenient temperature is about 60° C. or about 70° C. In some embodiments, the polymerization processes independently run under a pressure of about 1000 pounds per square inch (psi) or less, i.e., about 70 atmospheres (atm) or 7000 kilopascals (kPa), or less. Preferably the polymerization processes independently run under a pressure of from about 0.9 atm to about 50 atm (i.e., from about 91 kiloPascals (kPa) to about 5000 kPa). A convenient pressure is from 3000 kPa to 4900 kPa.

In some embodiments, the composition of formula (IV) is prepared in situ, and then used in a subsequent process step as described previously; stored for future use; or isolated and stored for future use (e.g., in a polyester-, polyether, polyamide- or polyisocyanate-forming process or as a chain shuttling agent to prepare another composition of formula (IV) or (IVa). Similarly, in some embodiments, the composition of formula (IVa) is prepared in situ, and then used in a subsequent process step as described previously; stored for future use; or isolated and stored for future use (e.g., in a polyester-, polyether, polyamide- or polyisocyanate-forming process).

In some embodiments, the invention process comprises terminating the (polyolefin-polyradical)-containing multifunctional chain shuttling agent (e.g., the composition of formula (IV)) to form the polyolefin. The polyolefin is thereby released from the multifunctional chain shuttling agent while leaving terminal functional groups attached to the polyolefin. Such terminating comprises, for example, contacting the (polyolefin-polyradical)-containing multifunctional chain shuttling agent to a terminating agent (i.e., quenching) to give the polyolefin (e.g., the poly(olefin monomer-olefin comonomer) block copolymer). The terminating agent preferably comprises a proton source (e.g., water, aqueous acid, or an alcohol such as 2-propanol). In some embodiments, the terminating agent further comprises a stabilizing agent such as, for example, an antioxidant (e.g., a hindered phenol antioxidant (IRGANOX™ 1010 from Ciba Geigy Corporation)), a phosphorous stabilizer (e.g., IRGAFOS™ 168 from Ciba Geigy Corporation), or both.

Preferably, the invention telechelic polyolefin is characterizable as having a non-statistical distribution of the first and second terminal functional groups.

In some embodiments, the invention process comprises a step of terminally functionalizing the polyolefin-polyradical of the (polyolefin-polyradical)-containing multifunctional chain shuttling agent to form the invention telechelic polyolefin (e.g., the telechelic poly(olefin monomer-olefin comonomer)). Such terminal functionalization comprises conversion of an end (e.g., comprising a carbanion) of the polyolefin-polyradical into vinyl, hydroxyl, amine, silane, carboxylic acid, carboxylic acid ester, ionomeric, or other terminal functional group. Such terminal functionalization can be accomplished according to known and established techniques. Examples of chemistry suitable for terminally functionalizing the polyolefin-polyradical of the (polyolefin-polyradical)-containing multifunctional chain shuttling agent are dehydrogenation, dehydration, hydrolysis, aminolysis, silylation, oxidation, oxidative esterification, and ion exchange (e.g., to convert carboxylic acid groups to —$CO_2$Na moieties).

Referring to formula (IV), the terminal functional groups derived from terminating the X portion(s) from formula (IV) at attachment(s) to $M^2$ are hydroxyl groups (i.e., —OH groups) when X is O; ($C_1$-$C_{20}$)hydrocarbyl substituted amino groups (i.e., —NH—($C_1$-$C_{20}$)hydrocarbyl) when X is N(($C_1$-$C_{20}$)hydrocarbyl); amino groups (—$NH_2$) when X is N(H); —SH groups when X is S; —$PH_2$ groups when X is P(H); and ($C_1$-$C_{20}$)hydrocarbyl substituted phosphorous groups (i.e., —PH—($C_1$-$C_{20}$)hydrocarbyl) when X is P(($C_1$-$C_{20}$)hydrocarbyl). Each of the terminal functional groups derived from terminating the polyolefin-polyradical portion(s) from formula (IV) at attachment(s) to $M^1$ independently is the vinyl, hydroxyl, amine, silane, carboxylic acid, carboxylic acid ester, ionomeric, or other terminal functional group. Preferably, the invention telechelic polyolefin comprises a telechelic polyolefin of formula (V): T-polyolefin-$CH_2$—$R^L$—(X—H)$_w$ (V), wherein w is an integer of 1 or 2; each $R^L$ independently is ($C_1$-$C_{19}$)alkylene or ($C_2$-$C_{19}$)alkenylene; and each X independently is as defined for formula (I). Accordingly, termination of the composition of formula (IV) produces a telechelic polyolefin characterizable as having at least one terminal functional group of formula —X—H and at least one terminal functional group of formula T-, wherein T is vinyl, hydroxyl, amine, silane, carboxylic acid, carboxylic acid ester, ionomeric, or other terminal functional group, thereby establishing a preferred embodiment of the telechelic polyolefin characterizable as having a non-statistical distribution of terminal functional groups —X—H and T—.

In some embodiments, the invention process comprises a step of terminating the polyolefin-polyradical of the (polyolefin-polyradical)-containing multifunctional chain shuttling agent to form the invention end functional polyolefin of formula (III). Again referring to formula (IV), terminally protonating the polyolefin-polyradical followed by terminating the X portion(s) from formula (IV) gives the invention end functional polyolefin of formula (III).

In the end functional polyolefin of formula (III) and the telechelic polyolefin of formula (V), preferably w is 1.

In some embodiments, the polyolefin-polyradical of the (polyolefin-polyradical)-containing multifunctional chain shuttling agent is coupled through use of a polyfunctional coupling agent to form a new diblock, triblock- or higher block copolymer, which includes hyper-branched and dendrimers derivatives, Preferably, the (polyolefin-polyradical)-containing multifunctional chain shuttling agent is employed with a polyester-, polyether-, polyamide- or polyisocyanate-forming monomer in a respective invention process for polymerizing the polyester-, polyether-, polyamide- or polyisocyanate-forming monomer, thereby making the invention polyolefin/polyester, polyether-, polyamide-, or polyisocyanate multiblock interpolymer (e.g., the invention poly(olefin monomer-olefin comonomer)/polyester, /polyether-, /polyamide-, or /polyisocyanate multiblock interpolymer). Preferably, the polyester-, polyether-, polyamide- or polyisocyanate-forming monomer comprises a hydroxy-substituted carboxylic acid; a lactone; an oxetane; an oxirane (i.e., epoxide); a lactam; an isocyanate; a mixture comprising a diol and either a dicarboxylic acid, dicarboxylic diester, dicarboxylic anhydride, or dicarboxylic dihalide; or a mixture comprising a dicarboxylic acid and an epoxide. In some embodiments, the polyester-forming monomer comprises the lactone, the polyester-forming conditions comprise living anionic ring-opening polymerization, and the polyolefin/polyester block copolymer comprises a polyolefin/ring-opened polyester block copolymer. In some embodiments, the lactone comprises ε-caprolactone or (D,L)-lactide. In some embodiments, the polyether-forming monomer comprises the epoxide (preferably ethylene oxide or propylene oxide), the polyether-forming conditions comprise living anionic ring-opening polymerization, and the polyolefin/polyether block copolymer comprises a polyolefin/ring-opened polyether block copolymer. In some embodiments, the polyamide-forming monomer comprises the lactam (preferably, 3-oxo-2-aziridinylidene, 1-methyl-2-azetidinone, N-methylbutyrolactam, N-methylvalerolactam, or N-methyl-6-caprolactam), the polyamide-forming conditions comprise living anionic ring-opening polymerization, and the polyolefin/polyamide block copolymer comprises a polyolefin/ring-opened polyamide block copolymer. In some embodiments, the polyisocyanate-forming monomer comprises the isocyanate (preferably, phenylisocyanate, toluenediisocyanate or methylenediisocyanate), the polyisocyanate-forming conditions comprise living anionic polymerization, and the polyolefin/polyisocyanate block copolymer comprises a polyolefin polyisocyanate block copolymer.

The instant living anionic ring-opening polymerization step of polymerizing the polyester-, polyether-, or polyamide-forming monomer to make the polyester, polyether, or polyamide portion of the invention polyolefin/polyester, polyolefin/polyether, or polyolefin/polyamide multiblock interpolymer is an example of the aforementioned non-olefin polymerization reaction.

The instant block interpolymers are comprised of two or more blocks or segments which are joined to form a single interpolymer, and each block or segment is chemically or physically distinguishable (other than by molecular weight or molecular weight distribution) from adjoining blocks or segments, the resulting block interpolymer possesses unique physical and chemical properties compared to random interpolymers of the same gross chemical composition. In some embodiments, the poly(olefin monomer-olefin comonomer) comprise three or more blocks or segments and, thus, the poly(olefin monomer-olefin comonomer)/polyester, /polyether, /polyamide, and /polyisocyanate multiblock interpolymers comprise a total of four or more blocks or segments per polymer molecule. Preferably, the poly(olefin monomer-olefin comonomer) portions thereof comprise four or more blocks or segments and, thus, the respective instant block respectively comprise a total of five or more blocks or segments per polymer molecule.

In some embodiments, invention poly(olefin monomer-olefin comonomer)/polyester, poly(olefin monomer-olefin comonomer)/polyether, poly(olefin monomer-olefin comonomer)/polyamide, or poly(olefin monomer-olefin comonomer)/polyisocyanate multiblock interpolymers are characterizable as having a high degree of polydispersity (e.g., PDI greater than 3). In some embodiments, the poly (olefin monomer-olefin comonomer) portion thereof is characterizable as being derived from, and having the mesophase separation characteristics of, the mesophase-separated olefin multiblock interpolymer.

In some aspects of the thirteenth embodiment, the process comprises a step of: contacting together ingredients comprising the (polyolefin-polyradical)-containing multifunctional chain shuttling agent comprising any one of the embodiments of the multifunctional chain shuttling agent and respectively a polyester-, polyether-, polyamide-, or polyisocyanate-forming monomer; the contacting step being performed under polyester-, polyether-, polyamide-, or polyisocyanate-forming conditions, thereby respectively preparing a polyolefin/polyester multiblock interpolymer, polyolefin/polyether multiblock interpolymer, polyolefin/polyamide multiblock interpolymer, or polyolefin/polyisocyanate multiblock interpolymer.

The invention articles include objects comprising at least one film layer, such as a monolayer film, or at least one layer in a multilayer film prepared by cast, blown, calendered, or extrusion coating processes; molded articles, such as blow molded, injection molded, or rotomolded articles; extrusions; fibers; and woven or non-woven fabrics. In some embodiments, the invention articles are comprised of or are formed from thermoplastic compositions comprising the inventive polymers including blends with other natural or synthetic polymers, additives, reinforcing agents, ignition resistant additives, antioxidants, stabilizers, colorants, extenders, crosslinking agents, blowing agents, and plasticizers.

Preferably, the article of the present invention comprises a natural or, preferably, synthetic lubricant. More preferably, the article of the present invention comprises an elastic film for a hygiene application (e.g., for a diaper cover); flexible molded good comprising an appliance, tool, consumer good (e.g., a toothbrush handle), sporting good, building and construction component, automotive part, or medical component (e.g., device); flexible gasket (e.g., refrigerator door gasket); flexible profile; an adhesive (e.g., for packaging, tape, or label); or a foam (e.g., for a sporting good, packaging, consumer good, automotive padding, or foam mat). Still more preferably, the article of the present invention comprises a photonic material, barrier film, separation membrane (also known as a microporous film), compatibilizer, or battery separator.

The term "photonic material" means a substance characterizable as having periodic, phase-separated mesodomains alternating in refractive index, with the domains sized to provide a photonic band gap in the UV-visible spectrum, such as those disclosed in U.S. Pat. No. 6,433,931. Examples of the photonic materials are a photonic crystal, photonic band gap material, and elastomeric optical interference film. The photonic materials are useful in applications requiring reflectance, transmission, or both of electromagnetic radiation, especially in infrared, visible, or ultraviolet wavelengths. Examples of such applications are anti-counterfeiting uses and security films, microtaggants, display films, and light filtering (e.g., backlit displays).

Examples of the barrier films are bladders in shoes (e.g., athletic shoes) and packaging (e.g., food packaging). Examples of the separation membranes are membrane filters, including gas separation membranes, dialysis/hemodialysis membranes, reverse osmosis membranes, ultrafiltration membranes, and microporous membranes. Areas in which these types of membranes may be applicable include analytical applications, beverages, chemicals, electronics, environmental applications, and pharmaceuticals.

In addition, microporous polymeric films may be used as battery separators. Where the article comprises a battery separator, preferably instant block interpolymers comprising same is in a form of a microporous polymeric film. Such microporous polymeric films advantageously can be used as battery separators because of their ease of manufacture, chemical inertness and thermal properties. The principal role of a battery separator is to allow ions to pass between the electrodes but prevent the electrodes from contacting each other. Hence, the microporous polymeric films comprised of the instant block interpolymers preferably inhibit or prevent puncture thereof. Also, for use in lithium-ion batteries the microporous polymeric films preferably would shut-down (stop ionic conduction) at certain temperatures to prevent thermal runaway of the battery. Preferably, the instant block interpolymers used for the battery separator would have high strength over a large temperature window to allow for either thinner or more porous battery separators, or a combination thereof. Also, for lithium ion batteries lower shut-down temperatures are preferable, and the microporous polymeric film preferably would maintain mechanical integrity after shut-down. Additionally, it is preferable that the microporous polymeric film would maintain dimensional stability at elevated temperatures.

The microporous polymeric films of the present invention may be used in any of the processes or applications as described in, but not limited to, the following patents and patent publications: WO2005/001956A2; WO2003/100954A2; U.S. Pat. No. 6,586,138; U.S. Pat. No. 6,524,742; US 2006/0188786; US 2006/0177643; U.S. Pat. No. 6,749,961; U.S. Pat. No. 6,372,379 and WO 2000/34384A1.

Preferably, the photonic material, barrier film, separation membrane, compatibilizer, or battery separator comprises, or is prepared from, the mesophase-separated olefin multiblock interpolymer or the poly(olefin monomer-olefin comonomer)/polyester, /polyether, /polyamide, or /polyisocyanate multiblock interpolymer having the portion characterizable as being derived from, and having the mesophase separation characteristics of, the mesophase-separated olefin multiblock interpolymer. Suitable methods for manufacturing porous structures and methods for forming patterns using block copolymer templates to form mesoporous materials are described in U.S. Pat. No. 7,517,466 B2. For use in or for preparing the photonic material or battery separator, preferably each of the mesophase-separated olefin multiblock interpolymer or at least the mesophase-separated olefin multiblock interpolymer portion of the poly(olefin monomer-olefin comonomer)/polyester, /polyether, /polyamide, or /polyisocyanate multiblock interpolymer independently is characterizable as having at least two domain sizes greater than 100 nm; a weight average molecular weight of less than 500,000 grams per mole; or more preferably both.

The mesophase separated structure provided by the instant block interpolymers provide several improvements over the prior art for forming microporous polymeric films. The ordered morphologies result in a greater degree of control over the pore size and channel structure. The phase separated melt morphology also limits film shrinkage in the melt and therefore imparts greater dimensional melt stability than in non-phase separated materials.

MATERIALS AND METHODS

All solvents and reagents are obtained from commercial sources and used as received unless indicated otherwise. Purify hexanes solvent through a column of activated alumina followed by a column of Q5 copper oxide on alumina (Cu-0226 S is obtained from (Engelhard, a subsidiary of BASF Corporation). Purify tetrahydrofuran (THF) and diethyl ether through columns of activated alumina. Synthesize and store all metal complexes in a Vacuum Atmospheres inert atmosphere glove box under a dry nitrogen atmosphere. Record NMR spectra on a 300 megahertz (MHz) Varian INOVA spectrometer. Report chemical shifts in parts per million ($\delta$) versus tetramethylsilane and referenced to residual protons in a deuterated solvent.

Determine percent incorporation of 1-octene and polymer density by Infrared (IR) Spectroscopy: Deposit 140 microliters (μL) of each polymer solution in 1,2,4-trichlorobenzene (TCB) onto a silica wafer, heat at 140° C. until the TCB evaporates, and analyze using a Nicolet Nexus 670 FT-IR with 7.1 version software equipped with an AutoPro auto sampler.

Gel Permeation Chromatography (GPC):

Determine weight average molecular weight ($M_w$) and polydispersity index: Determine $M_w$ and ratio of $M_w/M_n$ (polydispersity index or PDI) using a Polymer Labs™ 210 high temperature gel permeation chromatograph. Prepare samples using 13 mg of polyethylene polymer that is diluted with 16 mL of 1,2,4-trichlorobenzene (stabilized with butylated hydroxytoluene (BHT)), heat and shake at 160° C. for 2 hours.

Standard DSC method: Determine melting and crystallization temperatures and heat of fusion by Differential Scanning calorimetry using a DSC 2910 instrument (TA Instruments, Inc.): Under nitrogen purge gas, first heat samples from room temperature to 180° C. at a heating rate of 10° C. per minute. Hold at this temperature for 2 to 4 minutes, cool the samples to −40° C. at a cooling rate of 10° C. per minute; hold the sample at the cold temperature for 2 to 4 minutes, and then heat the sample to 160° C.

Analyzing end groups by proton-nuclear magnetic resonance ($^1$H-NMR) spectroscopy using a Varian 600 MHz NMR instrument and deuterated tetrachloroethane.

Abbreviations (meanings): r.t. and RT (room temperature); g (gram(s)); mL (milliliter(s)); ° C. (degrees Celsius); mmol (millimole(s)); MHz (MegaHertz); Hz (Hertz).

EXAMPLE(S) OF THE PRESENT INVENTION

The following examples are provided to further illustrate, but not limit scope of, the present invention.

Example 1

Synthesis of Multifunctional (Dual Functional) Chain Shuttling Agent (1)

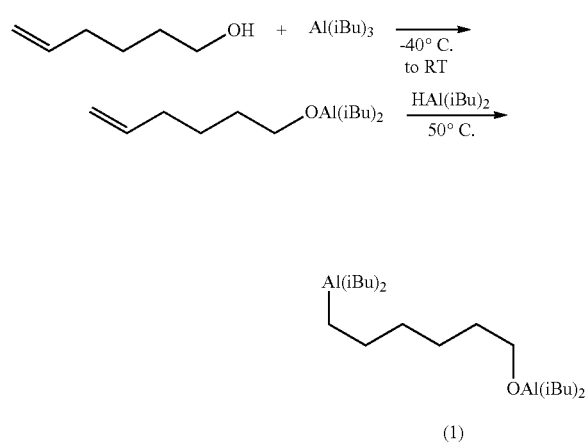

Set up and run the reaction in a nitrogen-purged glovebox. Weigh triisobutylaluminum (3.4 g, 17 mmol) into a glass jar charged with a polytetrafluoroethylene (PTFE)-coated stir bar and dissolve in 20 mL of hexanes. Weigh 5-hexen-1-ol (2.0 mL, 17 mmol) into a small glass vial and dissolve in 5 mL of hexanes. Place both solutions in a freezer at −40° C. Remove the solutions and add half of the 5-hexen-1-ol solution dropwise to the triisobutylaluminum solution while stirring. After adding about half of the 5-hexen-1-ol solution, place the solutions back in the freezer to cool back to −40° C. Remove the solutions after about 10 minutes and add the remainder of the 5-hexen-1-ol solution dropwise to the stirring reaction solution. Stir the resulting combined solution for 2 hours at room temperature (RT). Place the combined solution under vacuum to remove solvent. Analyze the resulting intermediate (3.68 g, 15 mmol) by $^1$H-NMR and $^{13}$C-NMR spectroscopy ($C_6D_6$). Dissolve the intermediate in 10 mL of toluene. Add to the resulting toluene mixture diisobutylaluminum hydride (2.18 g, 15.3 mmol). Stir the resulting mixture overnight at 50° C. in an aluminum heating block. Place the resulting colorless solution under vacuum to remove toluene. The resulting viscous liquid product is not soluble in d6-benzene ($C_6D_6$). Take a $^1$H-NMR spectrum in d8-THF: observe olefin peaks in the spectrum; approximately 17 weight % of the sample is the olefin as estimated by NMR. Transfer a majority of the product (4.23 g) to another glass jar and dissolve it in toluene (10 mL). Add diisobutylaluminum hydride (0.47 g). Stir the resulting solution with a PTFE-coated stir bar overnight at 50° C. Remove solvent in vacuo and transfer the resulting final product to a separate jar. Analyze the final product by NMR in d8-THF; the NMR spectrum is consistent with (1).

Example 2

Synthesis of Multifunctional Chain Shuttling Agent (2)

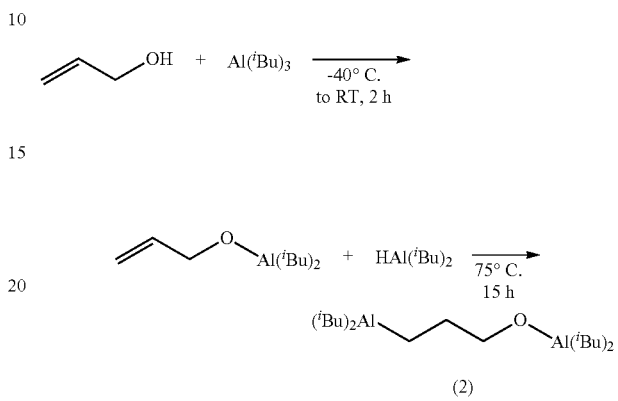

Set up and run the reaction in a nitrogen-purged glovebox. Weigh triisobutylaluminum (3.47 g) into a glass jar charged with a PTFE-coated stir bar and dissolve in toluene (20 mL). Weigh allyl alcohol (1.0 g) into a small glass vial and dissolve in toluene (10 mL). Seal both solutions with PTFE-lined caps and place them in a freezer at −40° C. for 10 minutes. Remove the solutions from the freezer and slowly add the alcohol solution to the aluminum solution while stirring. After about half the alcohol solution is added, re cool the solutions to −40° C. in the freezer. Remove the solutions from the freezer and slowly add the remainder of the alcohol. Stir the mixture at room temperature (RT) for about 2 hours. Place the solution under vacuum to remove solvent and yield a colorless liquid (3.18 g, FW 182.28). Take a proton NMR spectrum of the liquid in d-benzene: the spectrum indicates the desired intermediate is present. Add one mole equivalent (relative to the isolated product) of diisobutylaluminum hydride to the liquid. Stir and heat the resulting solution to 60° C. in an aluminum heating block and stir for a total of 8 hours. $^1$H NMR spectra shows the reaction is not complete after 4 hours and 8 hours. Stir the solution overnight at 75° C. while only lightly capped (to allow for loss of isobutylene). Place the liquid under vacuum: a small amount of gas comes out of solution, potentially due to a loss of isobutylene. Take NMR spectra of the remaining liquid: very messy spectra, consistent with the formation of multiple bridging species, but most of the vinyl group has been converted. Transfer the liquid to a vial: 3.48 g. Transfer a sample of the liquid to a small vial and dissolve in deuterated methylene chloride. Add deuterated methanol: observe a vigorous reaction and significant white solid forms. Stir the solution for over 1 hour. Dilute the solution with more deuterated methylene chloride and filter through a 0.45 micron disposable PTFE syringe frit. Take $^1$H and $^{13}$C NMR spectra: spectra are consistent with the presence of CH$_2$DCH$_2$CH$_2$OD and CH$_2$D-CH(CH$_3$)$_2$. This result is consistent with the liquid containing (2).

Example 3

Polymerization of 1-Octene with Multifunctional Chain Shuttling Agent (1) to Give (Polyolefin-Polyradical)-Containing Multifunctional Chain Shuttling Agent (3)

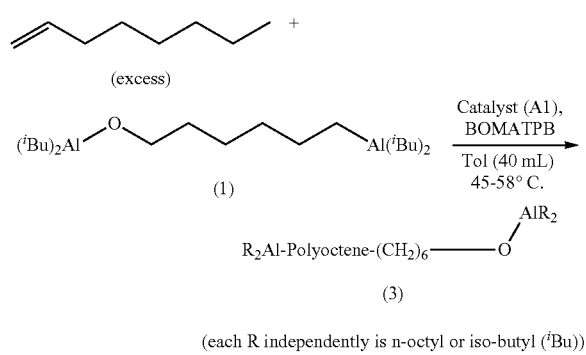

(each R independently is n-octyl or iso-butyl ($^i$Bu))

Set up and run the reaction in a nitrogen-purged glovebox. Weigh the multifunctional chain shuttling agent (1) of Example 1 (0.31 g) into a glass jar charged with a PTFE-coated stir bar and add 1-octene (22.4 g). The multifunctional chain shuttling agent (1) becomes a white solid in the 1-octene. Add toluene (40 mL). Heat the resulting mixture to 45° C. to dissolve most of the multifunctional chain shuttling agent (1). Form a catalyst solution by combining a solution of Catalyst (A1) as shown earlier (0.20 mL of a 0.005 M solution of in toluene) and a solution of cocatalyst (cocatalyst=bis(octadecyl)methylammonium tetrakis(pentafluorophenyl) borate ([HNMe(C$_{18}$H$_{37}$)$_2$][B(C$_6$F$_5$)$_4$], abbreviated as BOMATPB) (0.22 mL of a 0.005 M solution) about 5 minutes prior to their addition to the polymerization reaction. Add the catalyst solution to the polymerization reaction to give a reaction mixture. Place a thermocouple in the reaction mixture to monitor the temperature. The temperature rises to about 58° C. in 30 minutes before stabilizing. The solution becomes viscous. Once the temperature stops increasing, remove the reaction mixture from the aluminum heating block and placed in a freezer and −40° C. Remove solvent from the reaction mixture in vacuo and keep the resulting reaction product comprising (3) under vacuum overnight at 60° C. Take $^1$H and $^{13}$C NMR spectra of a sample of the reaction product in d8-toluene: observe the spectra are consistent with (3).

Example 4

Polymerization of D,L-Lactide with Multifunctional Chain Shuttling Agent (1)

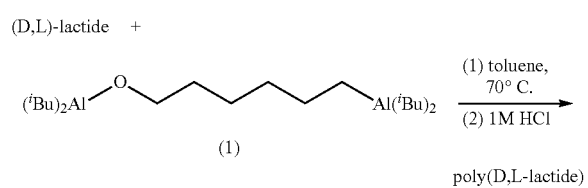

Day 1. In a N$_2$ glove box, add 5 mL of toluene to 20 mL vial charged with a stir bar and 0.249 g of initiator, the initiator being the multifunctional chain shuttling agent (1) of Example 1. The initiator does not completely dissolve at room temperature. Add 2.38 g of D,L-lactide to the vial followed by an additional 11 mL of toluene. Cap the reaction mixture and heat it to 70° C. using a thermocouple, heat-controlled glove box. (Turn heat on at 10:30 am and temperature reaches 70° C. at 10:40 am). Stir reaction overnight at 70° C.

Day 2. At 8 a.m., observe the reaction mixture has stopped stirring. Remove the vial cap and replace with a septum. Remove the vial from the glove box and quench it with about 0.3 mL of a 1 M HCl solution. Take an NMR spectrum of a sample in CDCl$_3$. Transfer the reaction mixture to a flask containing about 50 mL of methanol. Cool the cloudy mixture using a dry ice/acetone bath. Scoop out the resulting viscous polymer from the cloudy solution and place it into a small vial. Blow N$_2$ gas over the sample overnight to remove solvent to give final polymer product.

Day 3 Take a $^1$H NMR spectrum of the final polymer product in CDCl$_3$. The spectrum is consistent with the final polymer product comprising poly(D, L-lactide).

Example 5

Preparation of Poly(Octene-(D,L)-Lactide) Diblock Copolymer

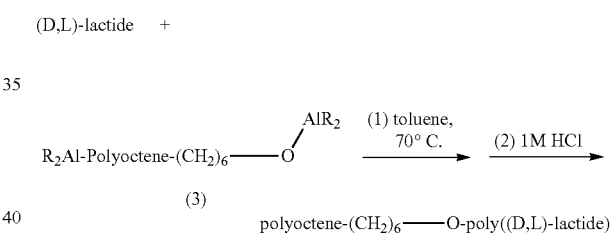

Repeat the procedure of Example 4 except instead of using the multifunctional chain shuttling agent (1) use instead the (polyolefin-polyradical)-containing multifunctional chain shuttling agent (3) to give poly(octene-(D,L)-lactide) diblock copolymer. The poly(octene-(D,L)-lactide) diblock copolymer is characterized as having a polyoctene block and a poly((D,L)-lactide) block, and an oxygen linking the polyoctene block to the poly((D,L)-lactide) block.

Example 6a

Preparation of a Telechelic Polyoctene

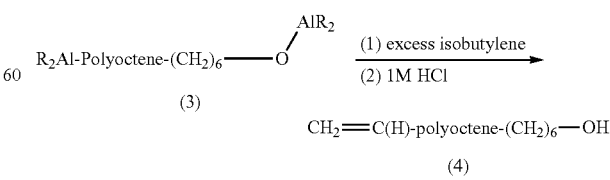

Contact the (polyolefin-polyradical)-containing multifunctional chain shuttling agent (3) to dehydrogenation conditions (e.g., displacement of $R_2Al$ with excess of an alpha-olefin such as isobutylene in Isopar E), followed by acidification to give the telechelic polyoctene (4), which is drawn to illustrate vinyl and hydroxyl terminal functional groups.

Example 6b

Preparation of a Telechelic Polyoctene

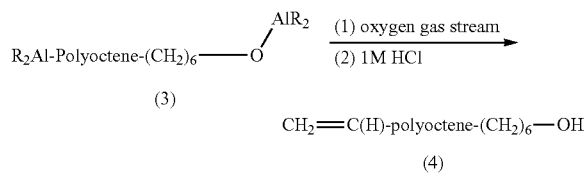

Contact a suspension of the (polyolefin-polyradical)-containing multifunctional chain shuttling agent (3) in toluene with a stream of oxygen for 1.5 hours at 60° C. (see Burfield, *Polymer* 1984; 25:1817-1822 for precedent). After the reaction is complete, quench the reaction by the addition of HCl in methanol to give the telechelic polyoctene (4).

Example 7

Synthesis of Multifunctional Chain Shuttling Agent (5)

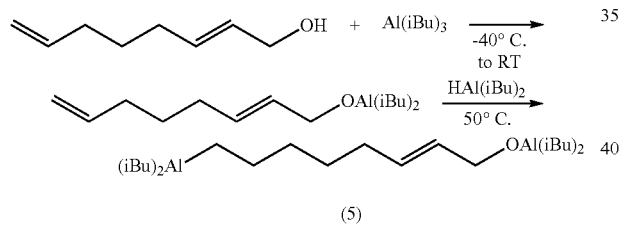

Repeat the procedure of Example 1 except as noted here. Use toluene (30 mL) to dissolve triisobutylaluminum (10.9 g) instead of hexanes; 2,7-octadien-1-ol (8.0 mL) instead of the 5-hexen-1-ol; toluene (10 mL) to dissolve the 2,7-octadien-1-ol instead of the hexanes; to give intermediate diisobutylaluminum 2,7-octadien-1-oxide (14.3 g), and analyze the intermediate by $^1$H-NMR spectroscopy ($C_6D_6$). (Note gas vigorously evolves during addition of the 2,7-octadien-1-ol solution in toluene to the triisobutylaluminum solution in toluene.) Add neat diisobutylaluminum hydride (3.8 g, 1.05 mole equivalents) to a portion (6.76 g) of the intermediate, and heat the resulting mixture at 60° C. for 6 hours. $^1$H-NMR spectroscopy (d8-THF) shows incomplete conversion of terminal olefin functional group. Add additional neat diisobutylaluminum hydride (0.4 mL) and stir at 60° C. overnight. Add hexane to give a colorless solution. Remove hexane under vacuum to give a colorless oil. Remove a 1.1 g portion and set aside remainder. Determine solubility of the resulting colorless oil: add 5 mL hexane to a 1.1 g portion of the colorless oil; mix; isolate a bottoms gel of 0.3 g solid; remainder of 1.1 g portion remains dissolved in hexane. Place remainder of colorless oil in 150 mL glass jar, and add 1-octene (5 mL) to it to consume excess aluminum hydride species. Seal jar, stir in aluminum heating block at 75° C. for 3 hours, then at room temperature overnight. Remove residual 1-octene in vacuo over 24 hours to give the multifunctional chain shuttling agent (5) as a colorless oil (6.1 g); $^1$H-NMR spectroscopy (d8-THF) is consistent with (5).

Example 8

Polymerization of 1-Octene with Multifunctional Chain Shuttling Agent (5) to Give (Polyolefin-Polyradical)-Containing Multifunctional Chain Shuttling Agent (6)

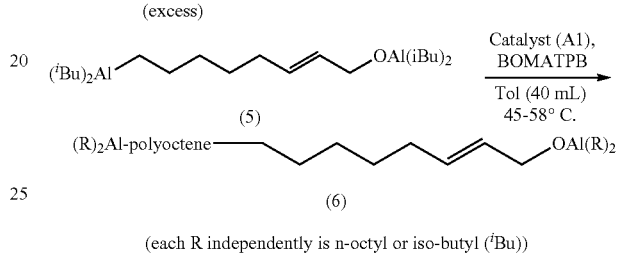

(each R independently is n-octyl or iso-butyl ($^i$Bu))

Repeat the procedure of Example 3 except use the multifunctional chain shuttling agent (5) of Example 7 instead of multifunctional chain shuttling agent (1) to give the (polyolefin-polyradical)-containing multifunctional chain shuttling agent (6).

Example 9

Synthesis of Multifunctional Chain Shuttling Agent (5a)

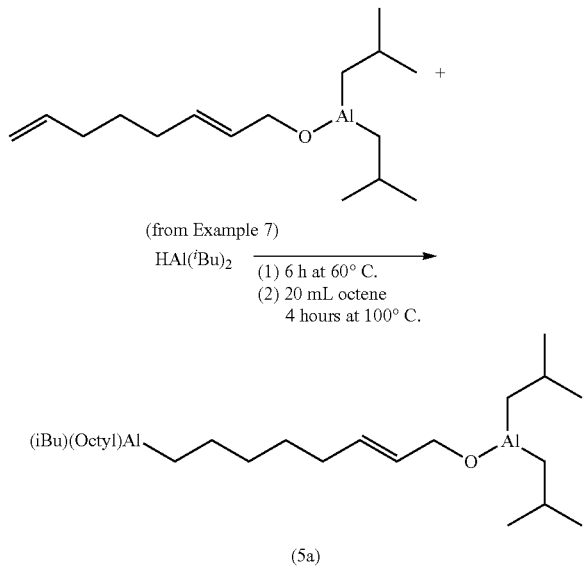

In a procedure similar to that of Example 7, a reaction is set up and run in a nitrogen purged glovebox. Weigh intermediate diisobutylaluminum 2,7-octadien-1-oxide (10.0 g, 37.5 mmol, prepared as in Example 7) into a glass jar charged with a poly(tetrafluoroethylene) (PTFE)-coated stir bar. Add to this diisobutylaluminum hydride (5.4 g, 37.5 mmol) at room temperature (RT) while stirring. Seal the glass jar, and stir the resulting mixture for 6 hours at 60° C. $^1$H NMR spectroscopy of the stirred mixture shows that a significant amount of unreacted vinyl groups are still present. Add another 80 mg of diisobutylaluminum hydride, and stir the new mixture overnight at 50° C. Add 1-octene (20 mL) to the new stirred mixture, and stir the resulting solution for 4 hours at 100° C. with a reflux condenser over the solution. Remove volatiles in vacuo, and analyze the residual product by $^1$H NMR spectroscopy (d8-THF). The $^1$H NMR data are consistent with multifunctional chain shuttling agent (5a). and show that approximately one isobutyl-Al group per aluminum in the intermediate diisobutylaluminum 2,7-octadien-1-oxide is converted to an n-octyl-Al group as shown in (5a).

Example 10

Polymerization of 1-Octene with Multifunctional Chain Shuttling Agent (5a) to Give (Polyoctene-Polyradical)-Containing Multifunctional Chain Shuttling Agent (6a)

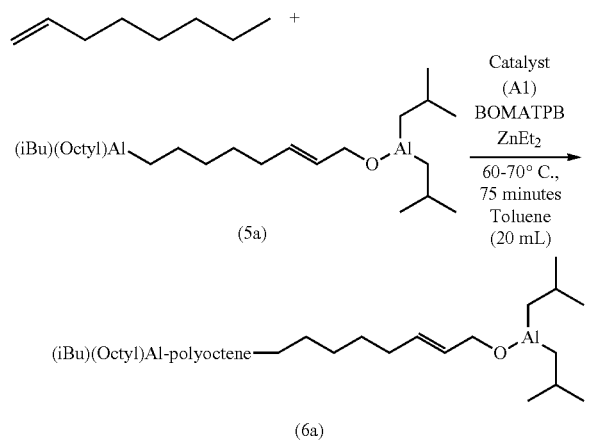

A reaction is set up and run in a nitrogen purged glovebox. Weigh multifunctional chain shuttling agent (5a) (1.5 g, about 3.0 mmol, Example 9) into a 120 mL glass jar with a PTFE-coated stir bar. Add diethylzinc (0.10 g, 0.75 mmol), and dilute the resulting mixture with 25 mL toluene. Add 1-octene (3 mL, 19 mmol) to the resulting solution with stirring. Place the stirring solution in an external (to the glass jar) aluminum heating block set at 60° C. and monitor the internal temperature of the solution with a thermocouple probe. Separately, combine Catalyst (A1) (0.3 mL of a 0.005M solution in toluene) with BOMATPB (0.36 mL of a 0.005M solution in toluene) in a small glass vial. Add the resulting contents of the vial to the solution to give a reaction solution. Add additional 1-octene to the reaction solution at a rate of 3 mL thereof every 10 minutes. After 30 minutes, no significant exotherm is noted, so make two separate additions of new solutions of Catalyst (A1) and BOMATPB (prepared as before) to the reaction solution. (Total catalyst amounts added overall: 4.5 μmol Catalyst (A1) and 5.4 μmol BOMATPB.) Temperature of the resulting reaction solution rises to 67° C. Maintain the temperature below 67° C. by lowering temperature of the external aluminum heating block. Add additional 1-octene at a rate of about 3 mL every 10 minutes until an overall total of 27 mL (173 mmol) of 1-octene is added. This prepares (polyoctene-polyradical)-containing multifunctional chain shuttling agent (6a) in situ. Quench the reaction by the addition of methanol thereto. Stir the resulting methanol-containing mixture for 4 hours at 60° C. to fully quench any alkylaluminum compounds. Remove solvent (toluene, methanol, excess 1-octene) in vacuo, and dry the resulting residue overnight at 60° C. under vacuum to yield 11.8 g of initial batch (polyoctene-polyradical)-containing multifunctional chain shuttling agent (6a). Analyze molecular weight of initial batch (6a) on a Viscotek gel permeation chromatography (GPC) instrument: $M_n$ is 2,446 g/mol and PDI is 3.63. From the molecular weight data, it is concluded that both Al and Zn are chain transferring in the above reaction with the catalyst (prepared from Catalyst (A1) and BOMATPB, as native $M_n$ of polyoctene is greater than 141,000 g/mol under same reaction conditions except lacking multifunctional chain shuttling agent (5a) and diethyl zinc.

Solvent treatment of initial batch (6a). Dissolve initial batch (6a) in a small amount of toluene and add 60 mL methanol. Stir the resulting mixture for 2 hours at 60° C. Pour off the resulting liquid from solids, and wash the solids with hot methanol. Dry the washed solids overnight at 100° C. under vacuum to give solvent treated (6a). Analyze solvent treated (6a) by $^1$H NMR spectroscopy (CDCl$_3$). Terminal alkoxy-Al group is present at 4.1 ppm and is present at a ratio of 1 terminal alkoxy-Al group per 274 octylene monomer units (determined from integration of CH$_3$ side chains). Analyze solvent treated (6a) by Viscotek GPC as before. Determine $M_n$ is 5,060 g/mol and PDI is 1.86 for solvent treated (6a). Molecular weight distribution of solvent treated (6a) shows a sharp cutoff below about 1000 (10$^3$) Daltons. Lower molecular weight polymer components in initial batch (6a) appear to have been removed by the solvent treatment. From the $^1$H-NMR spectrum and the molecular weight data, it can be estimated that 16 mol % of the polymer chains in solvent treated (6a) are terminated by an alkoxy-Al group.

As shown by the Examples, the invention multifunctional chain shuttling agents are characterizable as having at least two mutually compatible, yet different functional activities. One of the functional activities comprises a chain shuttling function. Another of the functional activities comprises a protecting/polymerization initiating function, which comprises a protecting group function or, in some embodiments, a polymerization initiating function, or in some embodiments both. The multifunctional chain shuttling agents incorporate at least two metal-containing, differently functional moieties into a single compound or molecule. The metal-containing functional moiety employed for chain shuttling successfully carries out chain shuttling functional activity in the presence of the metal-containing functional group employed for polymerization initiation or group protection. The invention provides for terminally functionalizing the polyolefin-polyradical of the (polyolefin-polyradical)-containing multifunctional chain shuttling agent or a means for initiating polymerization functional activity in the presence of the metal-containing functional group employed for chain shuttling. Such mutual compatibility between what until now could have been considered potentially conflicting functional moieties and activities is particularly valuable for making amphiphilic diblock and multiblock copolymers, especially in a continuous polymerization process.

While the present invention has been described above according to its preferred aspects or embodiments, it can be modified within the spirit and scope of this disclosure. This application is therefore intended to cover any variations, uses, or adaptations of the present invention using the general principles disclosed herein. Further, the application is intended to cover such departures from the present disclosure as come within the known or customary practice in the art to which this present invention pertains and which fall within the limits of the following claims.

What is claimed is:

1. A process for preparing a telechelic polyolefin, the process comprising a step of: terminally functionalizing a polyolefin-polyradical of a (polyolefin-polyradical)-containing multifunctional chain shuttling agent, thereby preparing a telechelic polyolefin, the telechelic polyolefin characterized as having spaced-apart first and second terminal functional groups, the process deriving the first terminal functional group from a chain shuttling moiety and the second terminal functional group from a polymerization initiating or protecting moiety, each such moiety being of the (polyolefin-polyradical)-containing multifunctional chain shuttling agent, the first and second terminal functional groups being structurally different from each other.

2. The process as in claim 1, the telechelic polyolefin characterized as having a non-statistical distribution of the first and second terminal functional groups.

3. A process for preparing an end functional polyolefin, the process comprising a step of: terminating a polyolefin-polyradical of a (polyolefin-polyradical)-containing multifunctional chain shuttling agent, thereby preparing an end functional polyolefin of formula (III): H-polyolefin-$CH_2$—$R^L$—$(X-H)_W$(III), wherein w is an integer of 1 or 2; each $R^L$ independently is $(C_1$-$C_{19})$alkylene or $(C_2$-$C_{19})$alkenylene; and each X independently is O, S, N(H), N(($C_1$-$C_{20}$)hydrocarbyl), P(H), or P(($C_1$-$C_{20}$)hydrocarbyl).

\* \* \* \* \*